(12) United States Patent
Cho et al.

(10) Patent No.: US 10,641,533 B2
(45) Date of Patent: May 5, 2020

(54) COMPRESSOR DRIVING APPARATUS AND HOME APPLIANCE INCLUDING THE SAME

(71) Applicant: LG ELECTRONICS INC., Seoul (KR)

(72) Inventors: Duseok Cho, Seoul (KR); Jangsik Kim, Seoul (KR); Jaedong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/139,316

(22) Filed: Sep. 24, 2018

(65) Prior Publication Data
US 2019/0093932 A1 Mar. 28, 2019

(51) Int. Cl.
| | |
|---|---|
| *H02P 1/26* | (2006.01) |
| *F25B 49/02* | (2006.01) |
| *H02M 7/48* | (2007.01) |
| *F04B 49/06* | (2006.01) |
| *F04B 49/20* | (2006.01) |
| *H02P 29/00* | (2016.01) |
| *H02P 29/40* | (2016.01) |
| *F25B 5/02* | (2006.01) |

(52) U.S. Cl.
CPC .......... *F25B 49/025* (2013.01); *F04B 49/06* (2013.01); *F04B 49/20* (2013.01); *F25B 49/022* (2013.01); *H02M 7/48* (2013.01); *H02P 29/0016* (2013.01); *F04B 2203/0201* (2013.01); *F04B 2203/0202* (2013.01); *F04B 2203/0209* (2013.01); *F25B 5/02* (2013.01); *F25B 49/02* (2013.01); *F25B 2600/021* (2013.01); *F25B 2600/112* (2013.01); *F25B 2600/2513* (2013.01); *F25B 2700/2104* (2013.01); *H02P 29/40* (2016.02)

(58) Field of Classification Search
CPC ........ H02P 21/14; H02P 29/032; H02P 29/40; H02P 6/28
See application file for complete search history.

(56) References Cited

U.S. PATENT DOCUMENTS

| | | | |
|---|---|---|---|
| 2013/0064684 A1* | 3/2013 | Endou | F04C 28/08 417/44.1 |
| 2017/0214354 A1* | 7/2017 | Yamakawa | F24F 1/0007 |

\* cited by examiner

*Primary Examiner* — Karen Masih
(74) *Attorney, Agent, or Firm* — KED & Associates, LLP

(57) ABSTRACT

A compressor driving apparatus, or a home appliance including the same, includes a DC terminal capacitor to store a charge, an inverter to convert direct current associated with the charge of the DC terminal capacitor into an alternating current and output the alternating current to a motor, an output current detection unit to detect an output current flowing in the motor, and an inverter controller to increase a motor speed by starting the motor, and controlling a speed increase of the motor to change based on an increasing slope of a change in an output current detected by the output current detection unit during the speed increase of the motor.

21 Claims, 17 Drawing Sheets

(a)

(b)

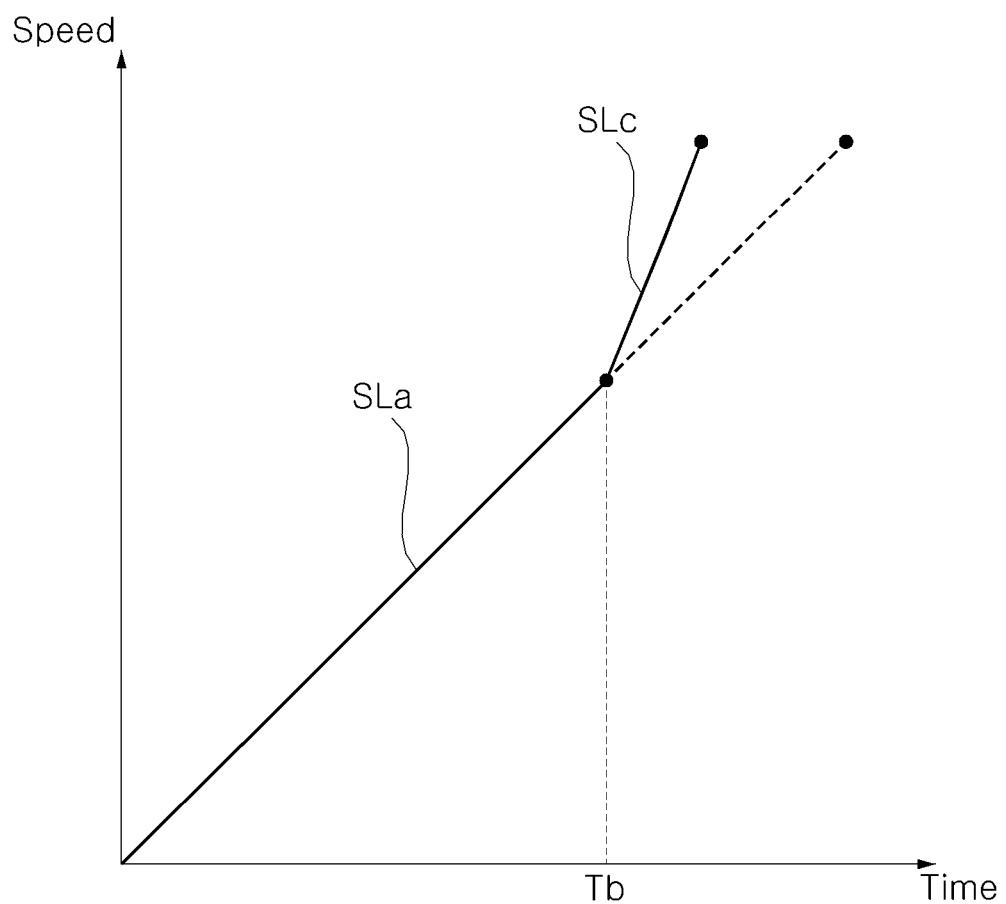

COMPRESSOR DRIVING APPARATUS AND HOME APPLIANCE INCLUDING THE SAME

CROSS-REFERENCE TO RELATED APPLICATION(S)

This application claims the priority benefit of Korea Patent Application No. 10-2017-0124518, filed on Sep. 26, 2017 in the Korean Intellectual Property Office, the disclosure of which is incorporated herein by reference.

BACKGROUND

1. Field

The present application relates to a compressor driving apparatus and a home appliance including the same, and more particularly, to a compressor driving apparatus capable of reducing a rapid increasing of an output current flowing in a compressor motor during a speed increasing of the compressor motor, and a home appliance including the same.

2. Background

A compressor driving apparatus is an apparatus to drive a compressor, and may include a compressor motor. Meanwhile, when a compressor having a large load fluctuation is driven, refrigerant compressed by the compressor should be quickly discharged to the outside.

Meanwhile, pertaining to the discharge of the refrigerant of the compressor, when an electronic expansion valve is used, there is little difference between the operating time of the compressor and the operating time of the electronic expansion valve. Thus, no significant influence occurs in the refrigerant discharge in the compressor. However, when a mechanical expansion valve is used instead of the electronic expansion valve, a difference between the operating time of the compressor and the operating time of the electronic expansion valve occurs. Accordingly, the current flowing in the compressor motor may increase rapidly. In particular, the current flowing in the compressor motor may increase rapidly during a speed increasing of the compressor motor.

BRIEF DESCRIPTION OF THE DRAWINGS

The embodiments will be described in detail with reference to the following drawings in which like reference numerals refer to like elements wherein:

FIGS. 10A to 11C are diagrams referenced in a description of the operation method of FIG. 9.

DETAILED DESCRIPTION

Hereinafter, the present application will be described in detail with reference to the accompanying drawings. With respect to constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1:
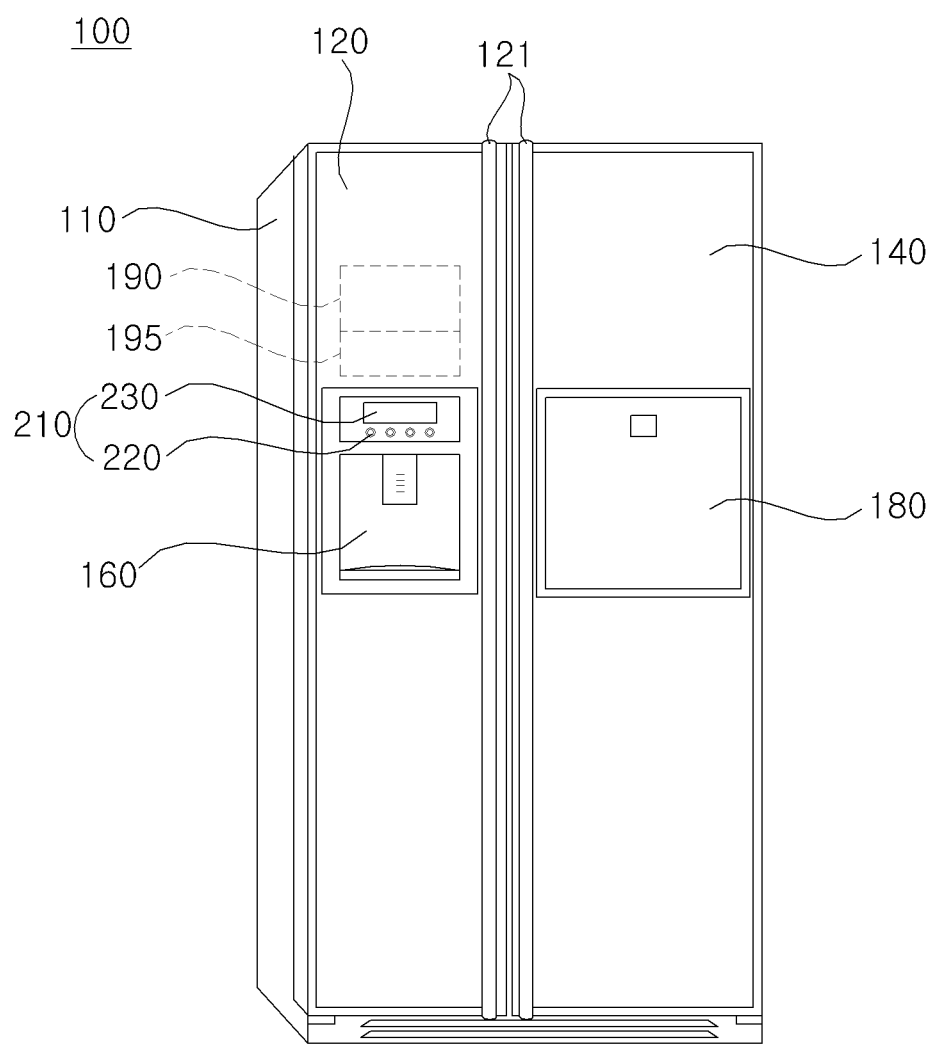
FIG. 1 is a perspective view illustrating a refrigerator as an example of a home appliance according to an embodiment of the present application.

FIG. 1 is a perspective view illustrating a refrigerator as an example of a home appliance according to an embodiment of the present application. With reference to the drawing, a refrigerator 100 according to an embodiment of the present application may include a case 110, which has an inner space, although not shown in the drawing, divided into a freezing compartment and a refrigerating compartment, a freezing compartment door 120 to shield the freezing compartment, and a refrigerating compartment door 140 to shield the refrigerating compartment, the case 110 and the doors 120 and 140 defining an outer appearance of the refrigerator 100.

The freezing compartment door 120 and the refrigerating compartment door 140 may be provided at front surfaces thereof with forwardly protruding door handles 121 to assist a user in easily pivoting the freezing compartment door 120 and the refrigerating compartment door 140 by gripping the door handles 121. The refrigerating compartment door 140 may further be provided at a front surface thereof with a so-called home bar 180 that allows the user to conveniently retrieve stored items, such as beverages, without opening the refrigerating compartment door 140.

The freezing compartment door 120 may further be provided at a front surface thereof with a dispenser 160 that allows the user to easily and conveniently retrieve ice or drinking water without opening the freezing compartment door 120. The freezing compartment door 120 may further be provided with a control panel 210 at the upper side of the dispenser 160. The control panel 210 serves to control drive operation of the refrigerator 100 and to display a screen showing a current operating state of the refrigerator 100.

Meanwhile, in the drawing, the dispenser 160 may be disposed on the front surface of the freezing compartment door 120. However, the dispenser 160 is not limited thereto and may be disposed on the front surface of the refrigerating compartment door 140.

In the upper portion of the inner side of the freezing compartment (not shown), there are provided an ice machine 190 for ice-making of supplied water by using cold air in the freezing compartment, and an ice bank 195 which is mounted inside the freezing compartment (not shown) so as to contain the ice that is made by and separated from the ice machine. Further, although not shown in the drawing, an ice chute (not shown) may be further provided to guide the ice contained in the ice bank 195 to be dropped onto the dispenser 160. The ice machine 190 shall be described later with reference to FIG. 3.

The control panel 210 may include an input unit 220 having a plurality of buttons and a display unit 231 to display a control screen, an operation state, and the like. The display unit 231 may display control screens, operating states, and other information, such as an internal temperature of the refrigerator, etc. For example, the display unit 231 may display a service type of the dispenser 160 (ice cubes, water, crushed ice), a set temperature of the freezing compartment, and a set temperature of the refrigerating compartment.

The display unit 231 may be any one of a liquid crystal display (LCD), light emitting diode (LED), and organic light emitting diode (OLED) units and the like. In addition, the display unit 231 may be a touch screen that may additionally perform a function of the input unit 220.

The input unit 220 may include a plurality of operation buttons. For example, the input unit 220 may include a dispenser setting button (not shown) to set a service type of the dispenser (ice cubes, water, crushed ice), a freezing compartment temperature setting button (not shown) to set a temperature of the freezing compartment, and a refrigerating compartment temperature setting button (not shown) to set a temperature of the refrigerating compartment. In addition, the input unit 220 may be a touch screen that may additionally perform a function of the display unit 231.

Meanwhile, the refrigerator according to the embodiment of the present application is not limited to a double door type shown in the drawing, and may be any one of a one door type refrigerator, a sliding door type refrigerator, a curtain door type refrigerator. Further, as described later, it is sufficient only when the ice bank 195 and an ice bank vibrating unit 175 for vibrating the ice bank 195 are disposed inside the freezing compartment.

Figure 2:
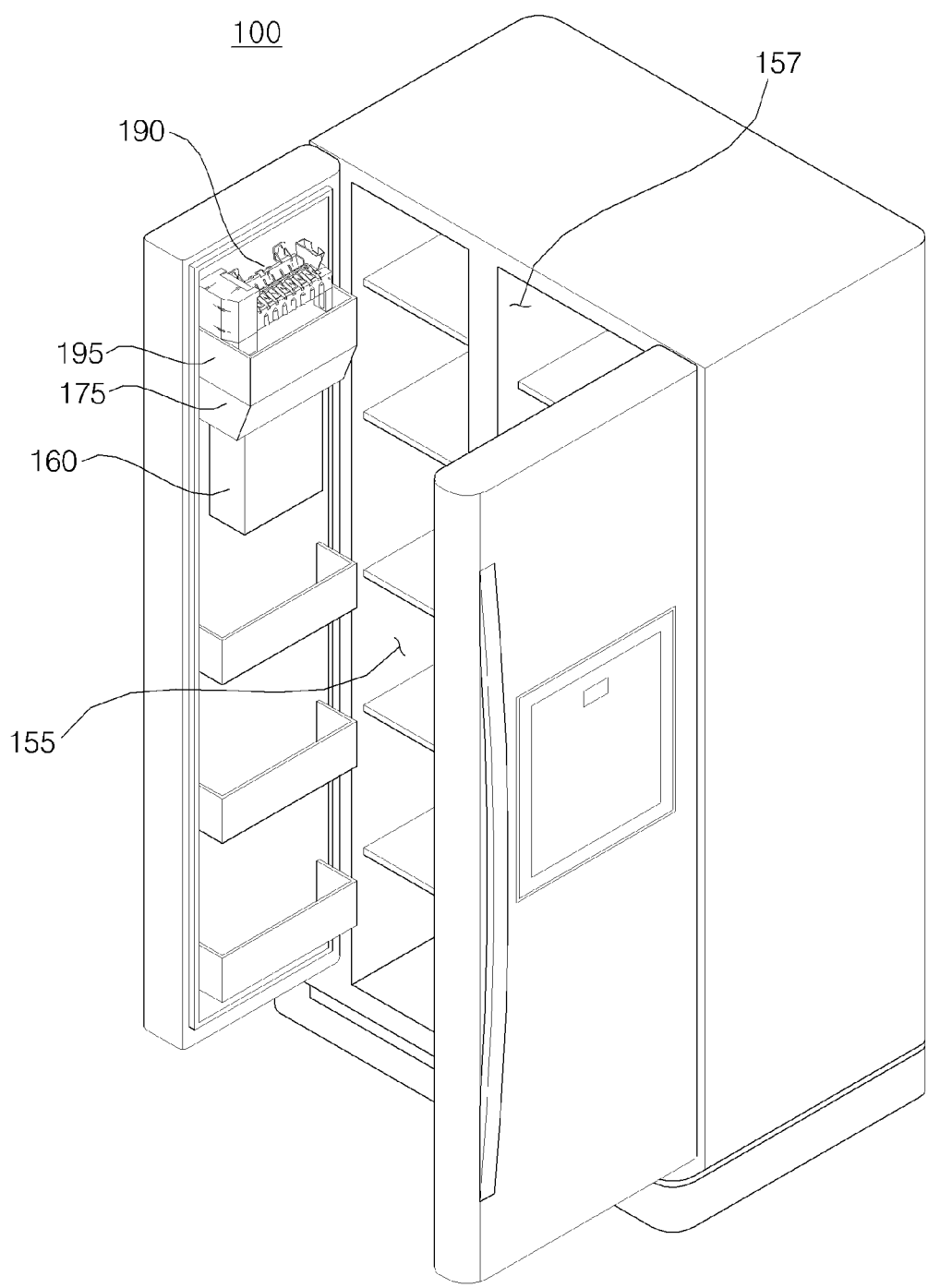
FIG. 2 is a perspective view of the refrigerator of FIG. 1 when a door of the refrigerator is opened.

FIG. 2 is a perspective view of the refrigerator of FIG. 1 when the door of the refrigerator is opened. With reference to the drawing, a freezing compartment 155 may be disposed inside the freezing compartment door 120 and a refrigerating compartment 157 may be disposed inside the refrigerating compartment door 140.

In the upper portion of the inner side of the freezing compartment 155, the ice machine 190 for ice-making of supplied water by using cold air in the freezing compartment, the ice bank 195 which is mounted inside the freezing compartment (not shown) so as to contain the ice that is made by and separated from the ice machine, the ice bank vibrating unit 175 for vibrating the ice bank 195, and the dispenser 160 may be disposed. Further, although not shown in the drawing, the ice chute (not shown) may be further disposed to guide the ice contained in the ice bank 195 to be dropped onto the dispenser 160.

Figure 3:
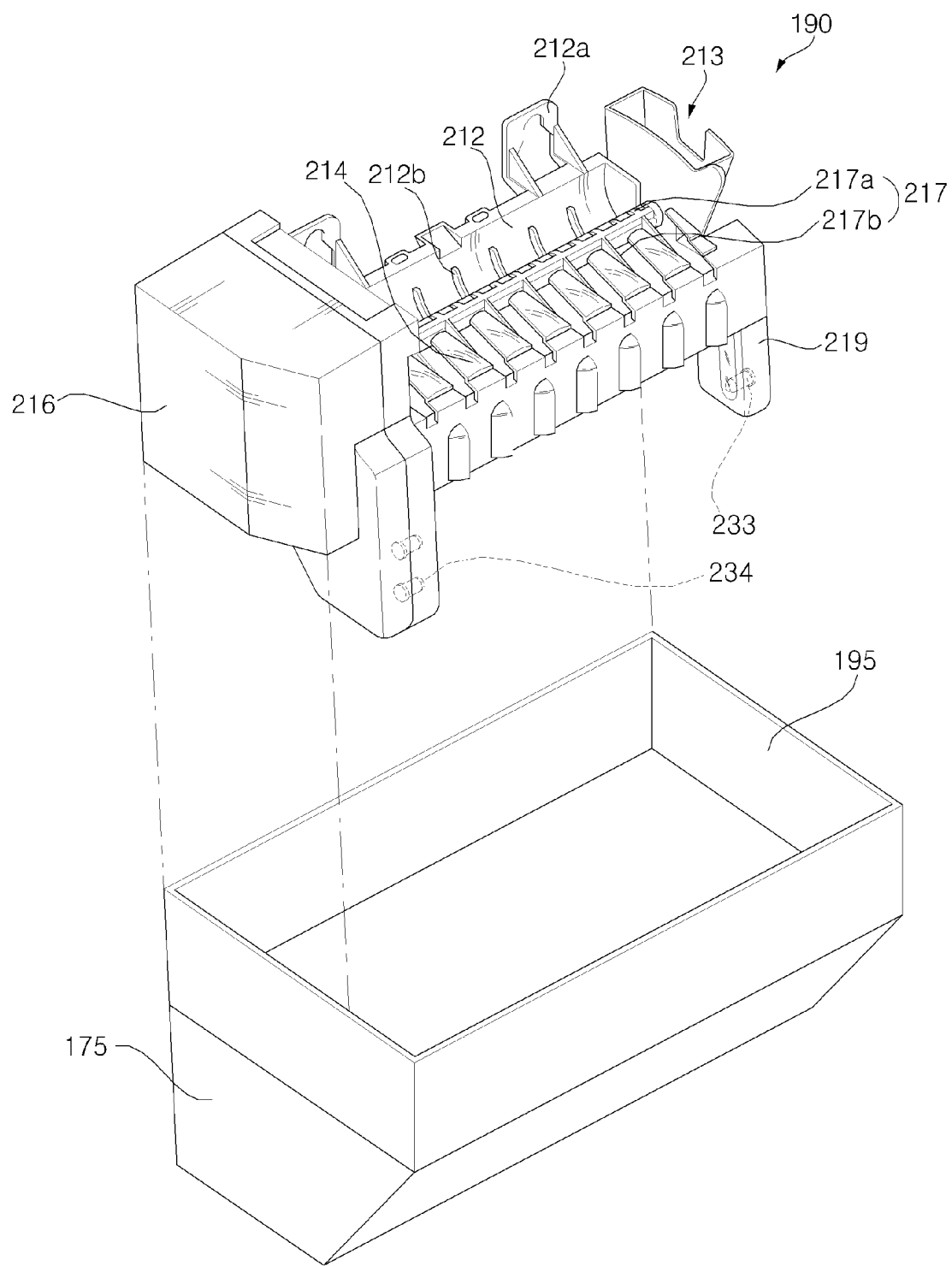
FIG. 3 is a diagram showing an ice machine of FIG. 2.

FIG. 3 is a view showing the ice machine of FIG. 2. With reference to the drawing, the ice machine 190 may include an ice-making tray 212 for containing water and making the water into a certain shape of ice, a water supplying portion 213 for supplying water to the ice-making tray 212, a slider 214 provided to allow the produced ice to be slid down to the ice bank 195, and a heater (not shown) for separating the produced ice from the ice-making tray 212.

The ice-making tray 212 may be fastened to the freezing compartment 155 of the refrigerator by a fastening portion 212a. The ice machine 190 may further include a ice-making driver 216 for operating an ejector 217, and the ejector 217 that is axially combined with a motor (not shown) provided in the ice-making driver 216 and ejects the ice which is completely made in the ice-making tray 212 into the ice bank 195. The ice-making tray 212 may have a substantially semi-cylindrical shape, and partitioning protrusions 212b may be formed in the inner surface of the ice-making tray 212 at certain intervals so that the ice can be separated and taken out.

The ejector 217 may include a shaft 217a formed to cross the center of the ice-making tray 212 and a plurality of ejector pins 217b formed on the side surface of the shaft 217a of the ejector 217. Here, each ejector pin 217b may be positioned between the partitioning protrusions 212b of the ice-making tray 212, respectively.

The ejector pin 217b is a means for ejecting the produced ice to the ice bank 195. For example, the ice moved by the ejector pin 217b may be put on the slider 214 and then slide along the slider 214 surface and fall into the ice bank 195.

Although not shown in the drawing, a heater (not shown) may be attached to the bottom surface of the ice-making tray 212, may raise the temperature of the ice-making tray 212, and may melt the ice adhering to the surface of the ice-making tray 212 so that the ice can be separated from the ice-making tray 212. The separated ice may be discharged to the ice bank 195 by the ejector 217.

Meanwhile, before separating the ice from the ice-making tray 212, the ice machine 190 may further include a light transmitting unit 233 and a light receiving unit 234 for detecting (hereinafter, referred to as 'ice full detecting') whether the ice is filled in the ice bank 195 located below. The light transmitting unit 233 and the light receiving unit 234 may be disposed below the ice machine 190 and may transmit and receive certain light into the ice bank 195 by using an infrared sensor, a light emitting diode (LED), or the like.

For example, when an infrared sensor type is used, an infrared ray transmitter 233 and an infrared ray receiving unit 234 may be provided below the ice machine 190. When it is not in an ice-full state, the infrared receiving unit 234 may receive a high level signal. When it is in an ice-full state, the infrared receiving unit 234 may receive a low level signal. Thus, a main microcomputer 310 may determine whether it is in an ice-full state. Meanwhile, one or more infrared ray receiving units 234 may be used, and two infrared ray receiving units 234 are shown in the drawing.

The light transmitting unit 233 and the light receiving unit 234 may be implemented in a structure embedded in a lower case 219 of the icemaker 190 so as to protect the device from moisture, frost, etc. due to the ice. The signal received in the light receiving unit 234 may be input to the main microcomputer 310. When it is in the ice-full state, the main microcomputer 310 may control the operation of the ice-making driver 216 so that the ice is no longer supplied to the ice bank 195.

Meanwhile, an ice bank vibration unit 175 for vibrating the ice bank 195 may be disposed in the lower end of the ice bank 195. In the drawing, the ice bank vibration portion 175 is disposed in the lower end of the ice bank 195. However, it is not limited thereto and may be disposed in any adjacent position such as the side surface as long as it can vibrate the ice bank 195.

Figure 4:
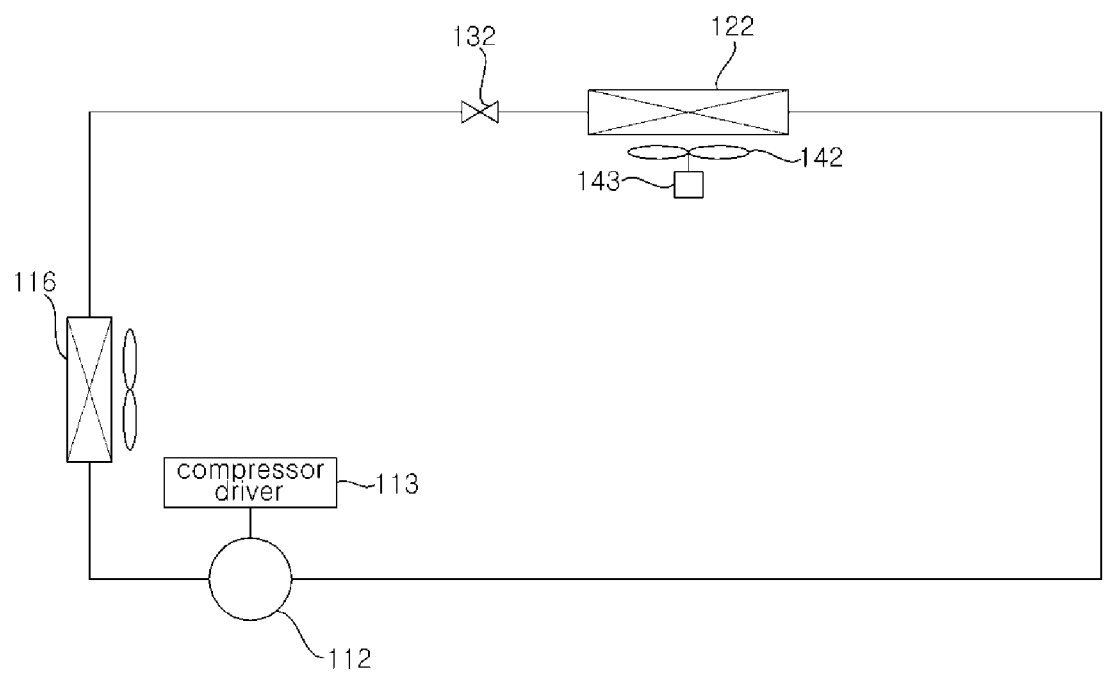
FIG. 4 is a diagram schematically illustrating a configuration of the refrigerator of FIG. 1.

FIG. 4 is a view schematically illustrating a configuration of the refrigerator of FIG. 1. With reference to the drawing, the refrigerator 1 may include a compressor 112, a condenser 116 to condense refrigerant compressed in the compressor 112, a freezing compartment evaporator 122 placed in the freezing compartment (not shown) to evaporate the condensed refrigerant directed from the condenser 116, and a freezing compartment expansion valve 132 to expand the refrigerant to be directed to the freezing compartment evaporator 122. Here, the freezing compartment expansion valve 132 may be a mechanical expansion valve.

While the drawing shows use of a single evaporator by way of example, evaporators may be respectively placed in the freezing compartment and the refrigerating compartment. That is, the refrigerator 100 may further include a refrigerating compartment evaporator (not shown) placed in the refrigerating compartment (not shown), a 3-way valve (not shown) to direct the condensed refrigerant from the condenser 116 to the refrigerating compartment evaporator (not shown) or the freezing compartment evaporator 122, and a refrigerating compartment expansion valve (not shown) to expand the refrigerant to be directed to the refrigerating compartment evaporator (not shown).

In addition, the refrigerator 100 may further include a gas-liquid separator (not shown) in which the refrigerant having passed through the freezing compartment evaporator 122 is divided into liquid and gas. The refrigerator 100 may further include a refrigerating compartment fan (not shown) and a freezing compartment fan 144, which suction cold air having passed through the freezing compartment evaporator 122 and blow the cold air to the refrigerating compartment (not shown) and the freezing compartment (not shown) respectively.

The refrigerator 100 may further include a compressor driver 113 to drive the compressor 112, a refrigerating compartment fan driver (not shown) to drive the refrigerating compartment fan (not shown), and a freezing compartment fan driver 145 to drive the freezing compartment fan 144.

Meanwhile, in the case in which the common evaporator 124 is used in the freezing compartment and the refrigerating compartment as shown in the drawing, a damper (not shown) may be installed between the freezing compartment and the refrigerating compartment, and a fan (not shown) may forcibly blow cold air generated by the single evaporator to the freezing compartment and the refrigerating compartment.

Figure 5:
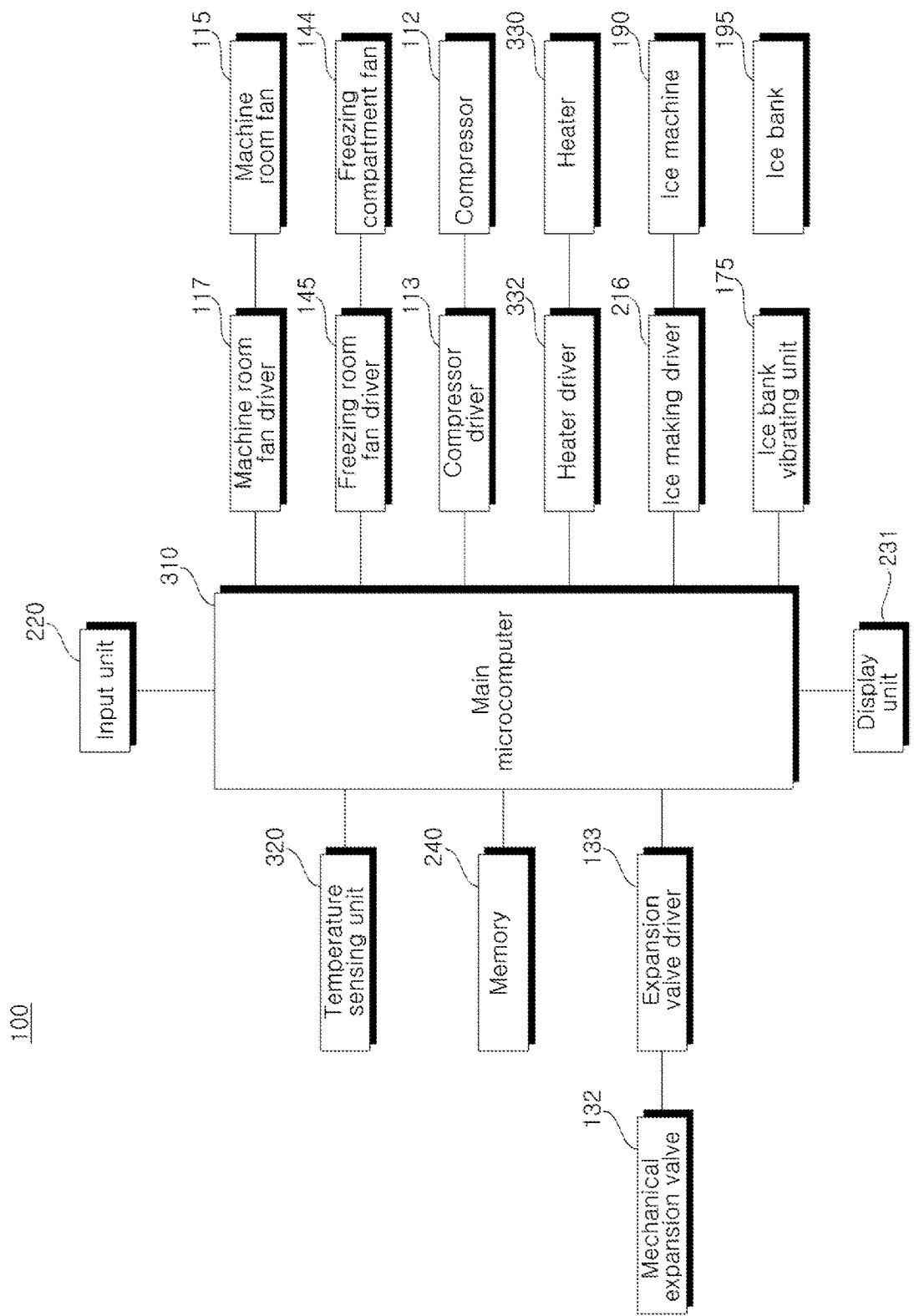
FIG. 5 is a block diagram schematically illustrating the inside of the refrigerator shown in FIG. 1.

FIG. 5 is a block diagram schematically illustrating the inside of the refrigerator shown in FIG. 1. With reference to the drawing, the refrigerator 100 may include the compressor 112, a machine room fan 115, the freezing compartment fan 144, a main microcomputer 310, a heater 330, the ice machine 190, the ice bank 195, a temperature sensing unit 320, and a memory 240.

In addition, the refrigerator 100 may further include the compressor driver 113, a machine room fan driver 117, a freezing room fan driver 145, a heater driver 332, an ice making driver 216, the ice bank vibrating unit 175, the display unit 231, the input unit 220, and an expansion valve driver 133 to drive the mechanical expansion valve 132. For a description related to the compressor 112, the machine room fan 115, and the freezing compartment fan 144, refer to FIG. 2.

The input unit 220 may include a plurality of operation buttons and transmits a signal related to an input freezing compartment set temperature or an input refrigerating compartment setting temperature to the main microcomputer 310. The display unit 231 may display the operation state of the refrigerator. Particularly, according to the embodiment of the present application, the display unit 231 may display final power consumption information or cumulative power consumption information based on the final power consumption. The display unit 231 may be operable under the control of a display microcomputer (not shown).

The memory 240 may store data necessary for the operation of refrigerator. Particularly, according to the embodiment of the present application, the memory 240 may store power consumption information for each of a plurality of power consumption units. The memory 240 may output corresponding power consumption information to the main microcomputer 310 according to the operation of each power consumption unit inside the refrigerator. Meanwhile, the memory 240 may store the component distribution of the plurality of power consumption units.

The temperature sensing unit 320 may sense the temperature in the refrigerator and transmit a signal related to the sensed temperature to the main microcomputer 310. Here, the temperature sensing unit 320 may sense the refrigerating compartment temperature and the freezing compartment temperature, respectively. Further, the temperature of each chamber in the refrigerating compartment or the temperature of each chamber in the freezing compartment may be sensed.

The main microcomputer 310 may control the compressor driver 113 and the fan driver 117 or 145 as exemplarily shown in the drawing to control turn-on/turn-off of the compressor 112 and the fan 115 or 144, thereby finally controlling the compressor 112 and the fan 115 or 144. Here, the fan driver may be the machine room fan driver 117 or the freezing compartment fan driver 145. For example, the main microcomputer 310 may output a speed command signal corresponding to the compressor driver 113 or the fan driver 117 or 145, respectively.

The compressor driver 113 and the freezing compartment fan driver 145 may include a compressor motor (not shown) and a freezing compartment fan motor (not shown) respectively, and these motors (not shown) may be operated respectively at target rotation speeds under control of the main microcomputer 310. The machine room fan driver 117 may include a machine room fan motor (not shown), and the machine room fan motor (not shown) may be operated at a target rotation speed under control of the main microcomputer 310.

In the case in which the aforementioned motors are three-phase motors, the motors may be controlled by switching operation in an inverter (not shown), or may be controlled to operate at a constant speed using an alternating current (AC) voltage. Here, the respective motors (not shown) may be any one of an induction motor, a brushless direct current (BLDC) motor, a synchronous reluctance motor (synRM), and the like.

Meanwhile, the main microcomputer 310, as described above, may control overall operations of the refrigerator 100, in addition to controlling operations of the compressor 112 and the fan 115 or 144. For example, the main microcomputer 310 may control operation of the ice bank vibrating unit 175. Particularly, when ice full is sensed, the main microcomputer 310 may control ice to be taken out from the ice machine 190 to the ice bank 195, and may control the ice bank 195 to vibrate when taking out the ice or after taking out the ice. As described above, by vibrating the ice bank 195 when taking out the ice, the ice in the ice bank 195 may not be stuck to each other and may be uniformly distributed.

The main microcomputer 310 may vibrate the ice bank 195 repeatedly at certain time intervals so as to prevent the ice from sticking to each other as the ice continues to be stored in the ice bank 195. When the dispenser 160 is operated by the user's operation, the main microcomputer 310 may control the ice in the ice bank 195 to be taken out to the dispenser 160, and may control the ice bank 195 to vibrate when taking out the ice or just before taking out the ice. Specifically, the main microcomputer 310 may control the ice bank vibrator 175 to operate the ice bank 195. Thus, when taking out the ice, the ice taken out by the user may be prevented from sticking to each other.

The main microcomputer 310 may control the heater (not shown) in the ice machine 190 to operate, in order to separate the ice in the ice-making tray 212. Meanwhile, the main microcomputer 310 may control the ice-making driver 216 to operate the ejector 217 in the ice machine 190 after the heater (not shown) is turned on. This is a control operation for smoothly taking out the ice into the ice bank 195. Meanwhile, when the ice in the ice bank 195 is determined to be ice full, the main microcomputer 310 may control to turn off the heater (not shown). In addition, the operation of the ejector 217 in the icemaker 190 may be controlled to stop.

Meanwhile, the main microcomputer 310 may control the overall operation of a refrigerant cycle in accordance with the set temperature from the input unit 220, as described above. For example, the main microcomputer 310 may further control the 3-way valve (not shown), the refrigerating compartment expansion valve (not shown), and the freezing compartment expansion valve 132, in addition to the compressor driver 113, the refrigerating compartment fan driver 143, and the freezing compartment fan driver 145. In addition, the main microcomputer 310 may control the operation of the display unit 231.

Meanwhile, the heater 330 may be a freezing compartment defrosting heater. The freezing compartment defrosting heater 330 may be operated to remove the frost adhering to the freezing compartment evaporator 124. To this end, the heater driver 332 may control the operation of the heater 330. Meanwhile, the main microcomputer 310 may control the heater driver 332.

Figure 6:
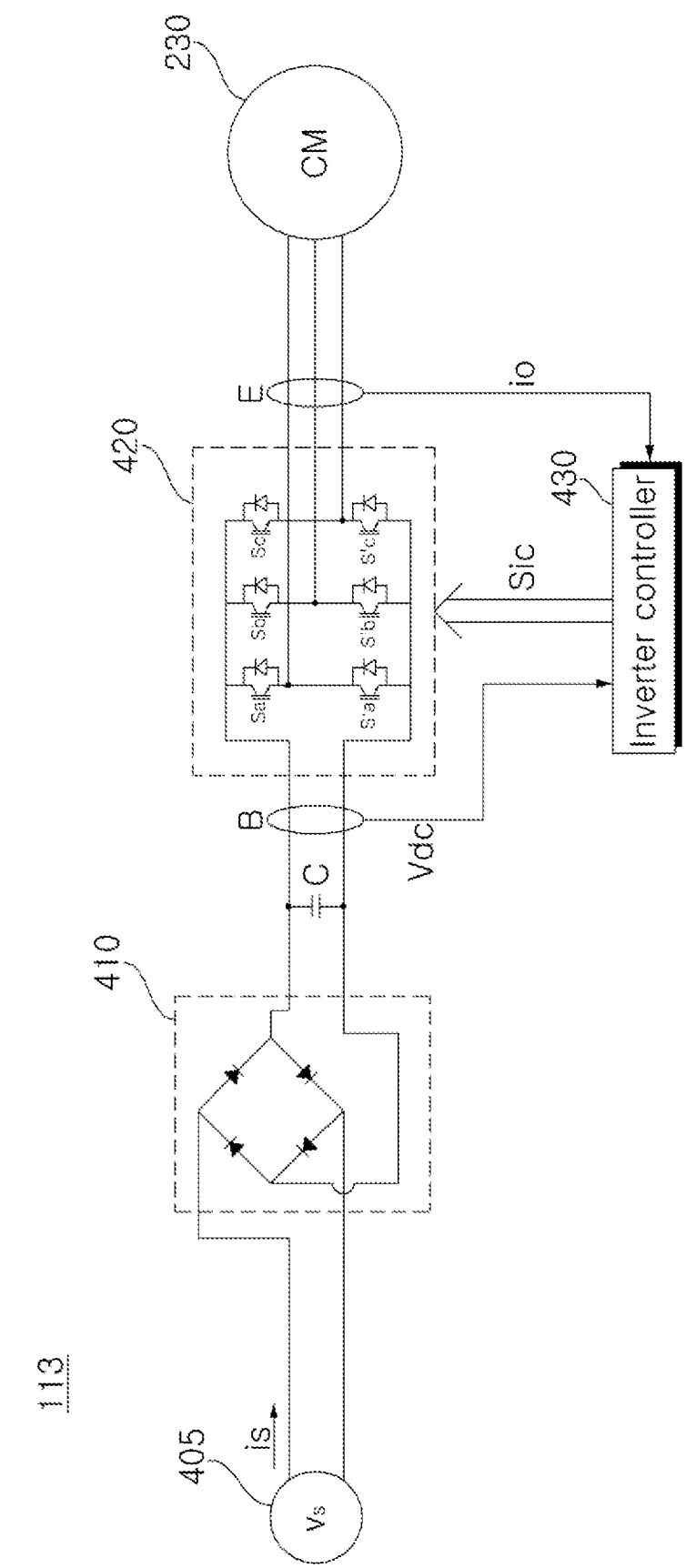
FIG. 6 is an example of an internal circuit diagram of a compressor driver of FIG. 5.

FIG. 6 is an example of an internal circuit diagram of the compressor driver of FIG. 5. Referring to the drawing, the compressor driver 113 according to an embodiment of the present application may include a rectifying unit 410, a DC terminal capacitor C, an inverter 420, an inverter controller 430, a DC terminal voltage detection unit (or DC terminal voltage detection circuitry) B, and an output current detection unit (or output current detection circuitry) E. Meanwhile, the compressor driving apparatus 113 according to the embodiment of the present application may not include an input current detecting unit to detect an input current and an input voltage detecting unit to detect an input voltage.

The rectifying unit 410 may rectify an input AC power 405 and output a rectified power. In the drawing, it is described that the rectifying unit 410 has a bridge diode, but various modifications can be achieved. For example, in the case of a single-phase AC power, four diodes may be used in the form of a bridge, and in the case of a three-phase AC power, six diodes may be used in the form of a bridge.

The output terminal of the rectifying unit 410 may be provided with a DC terminal capacitor C to store or smooth the rectified power. At this time, both ends of the DC terminal capacitor C may be called a DC terminal. The DC terminal capacitor C may smooth and store the input power. In the drawing, a single element is exemplified by the DC terminal capacitor C, but a plurality of elements may be provided, thereby ensuring the element stability.

Meanwhile, the DC terminal voltage may range from 200V to 300V, and a voltage step-down may be required to drive the main microcomputer 310 operating at several tens of volt. Although not shown in the drawing, in order to drive the main microcomputer 310, a voltage step-down unit for a voltage step-down may be disposed at both ends of the DC terminal capacitor C.

The DC terminal voltage detection unit B may detect a DC terminal voltage Vdc of both ends of the DC terminal capacitor C. To this end, the DC terminal voltage detection unit B may include a resistance element, an amplifier, and the like. The detected DC terminal voltage Vdc may be input to the inverter controller 430, as a discrete signal in the form of a pulse.

The inverter 420 may include a plurality of inverter switching elements, convert the smoothed DC power Vdc into a three-phase AC power va, vb, and vc of a certain frequency by the turn-on/turn-off of operation of the switching element, and output it to a three-phase synchronous motor 230 that may correspond to the compressor. The inverter 420 may include a pair made by the upper arm switching elements Sa, Sb and Sc and the lower arm switching elements S'a, S'b and S'c which are connected in series to each other. A total of three pairs of upper and lower arm switching elements may be connected in parallel with each other Sa&S'a, Sb&S'b, and Sc&S'c. Diodes may be connected in anti-parallel to each switching element Sa, S'a, Sb, S'b, Sc, and S'c.

The switching elements in the inverter 420 may perform the turn-on/turn-off of operation of the respective switching elements based on an inverter switching control signal Sic from the inverter controller 430. Thus, a three-phase alternating current power of variable frequency may be output to the three-phase synchronous motor 230.

The inverter controller 430 may control the switching operation of the inverter 420 based on a sensorless method. To this end, the inverter controller 430 may receive an output current io detected by the output current detection unit E.

The inverter controller 430 may output the inverter switching control signal Sic to the inverter 420 so as to control the switching operation of the inverter 420. The inverter switching control signal Sic is a switching control signal of a pulse width modulation method (PWM), and may be generated and output based on the output current io detected by the output current detection unit E. Detailed operation of the output of the inverter switching control signal Sic in the inverter controller 430 shall be described later with reference to FIG. 7.

The output current detection unit E may detect a phase current, that is, the output current io flowing in the three-phase motor 230. The output current detection unit E may be disposed, as shown in the drawing, between the inverter 420 and the motor 230 so as to detect a current flowing in the motor 230.

The output current detection unit E may include three resistance elements as shown in the drawing. The phase current ia, ib, and ic that is the output current io flowing in the motor 230 may be detected through the three resistance elements. The detected output current ia, ib, and ic is a discrete signal in the form of a pulse, and may be applied to the inverter controller 430. The inverter switching control signal Sic may be generated based on the detected output currents ia, ib, and ic. In the present specification, ia, ib, and ic, or io may be used interchangeably as the output current.

Meanwhile, unlike the drawing, the output current detection unit E may include two resistance elements. The phase current of the remaining one phase may be calculated using three-phase equilibrium. Meanwhile, unlike the drawing, the output current detection unit E may be disposed between the DC terminal capacitor C and the inverter 420, and have one shunt resistance element to detect the current flowing in the motor 230. This method may be called a one-shunt method.

According to the one-shunt method, the output current detection unit E may use one shunt resistor element and may detect the phase current which is the output current io flowing in the motor 230 in time division when the lower arm switching element of the inverter 420 is turned on.

The detected output current io is a discrete signal in the form of a pulse and may be applied to the inverter controller 430. The inverter switching control signal Sic may be generated based on the detected output current io. Meanwhile, the three-phase motor 230 may be provided with a stator and a rotor, and each phase alternating current power of a certain frequency may be applied to a coil of the stator of each phase (a, b, c phase) so that the rotor can rotate.

The motor 230 may include, for example, a surface mounted permanent magnet synchronous motor (SMPMSM), an interidcr permanent magnet synchronous motor (IPMSM), a synchronous reluctance motor (Synrm), and the like. Among these, the SMPMSM and the IPMSM are a permanent magnet synchronous motor (PMSM) to which permanent magnet is applied, and the Synrm has no permanent magnet.

Figure 7:
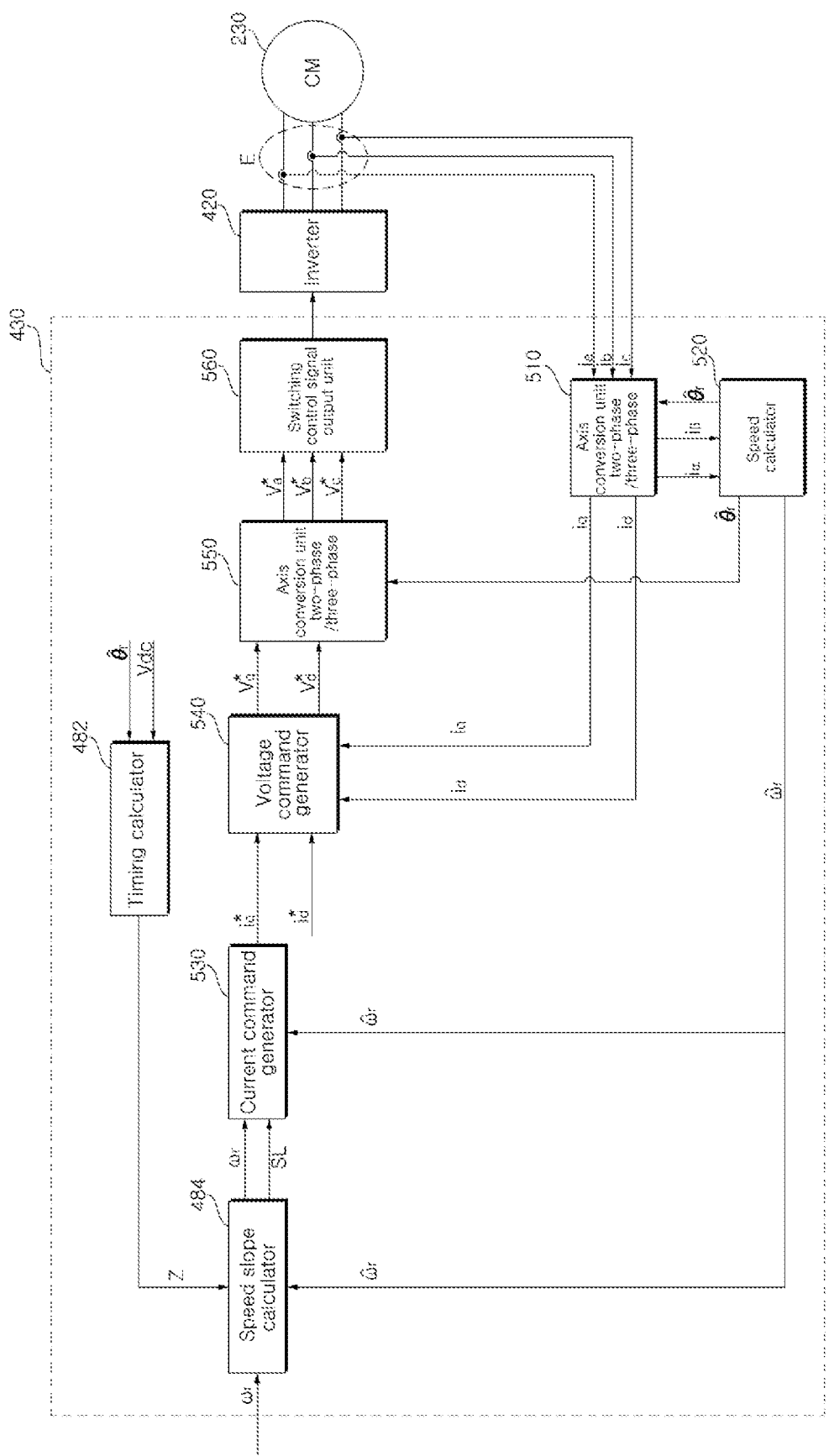
FIG. 7 is a circuit diagram illustrating an example of the inside of an inverter controller of FIG. 6, FIG. 8A and FIG. 8B are diagrams referenced in a description of an operation of a compressor and a mechanical expansion valve.

FIG. 7 is a circuit diagram illustrating an example of the inside of an inverter controller of FIG. 6. Referring to FIG. 7, the inverter controller 430 may include an axis conversion unit 510, a speed calculator 520, a current command generator 530, a voltage command generator 540, an axis conversion unit 550, and a switching control signal output unit 560.

The axis conversion unit 510 may receive the three-phase output currents ia, ib, and ic detected by the output current detection unit E and convert the received three-phase output currents ia, ib, and ic into a two-phase current iα and iβ in a stationary coordinate system.

Meanwhile, the axis conversion unit 510 may convert the two-phase current ia and iβ of the stationary coordinate system into a two-phase current id and iq of a rotating coordinate system. The speed calculator 520 may output a calculated position $\hat{\theta}_r$ and a calculated speed $\hat{\theta}_r$ based on the two-phase current iα and iβ of the stationary coordinate system that is axis-converted in the axis conversion unit 510.

Meanwhile, the current command generator 530 may generate a current command value i*q based on a computation speed $\hat{\omega}_r$ and a speed command value ω*r. For example, based on a difference between the computation speed $\hat{\omega}_r$ and the speed command value ω*r, the current command generator 530 may perform a PI control in a PI controller (not shown) and may generate the current command value i*q. In the drawing, the q-axis current command value i*q is illustrated as a current command value. However, unlike the drawing, a d-axis current command value i*d can be also generated. Meanwhile, the value of the d-axis current command value i*d may be set to zero. Meanwhile, the current command generator 530 may further include a limiter (not shown) to limit the level of the current command value i*q so as not to exceed a tolerance.

Then, the voltage command generator 540 may generate d-axis and q-axis currents id and iq that are axis-converted to the two-phase rotating coordinate system in the axis conversion unit, and may generate d-axis and q-axis voltage command values v*d and v*q based on the current command values i*d and i*q in the current command generator 530 or the like. For example, based on a difference between the q-axis current iq and the q-axis current command value i*q, the voltage command generator 540 may perform the PI control in the PI controller (not shown), and may generate q-axis voltage command value v*q. Further, based on a difference between the d-axis current id and the d-axis current command value i*d, the voltage command generator 540 may perform the PI control in the PI controller (not shown), and may generate a d-axis voltage command value v*d. Meanwhile, the voltage command generator 540 may further include a limiter (not shown) to limit the level of the d-axis and q-axis voltage command values v*d and v*q so as not to exceed a tolerance.

Meanwhile, the generated d-axis and q-axis voltage command values v*d, v*q may be input to the axis conversion unit 550. The axis conversion unit 550 may receive the position ($\hat{\omega}_r$) calculated by the speed calculator 520 and the d-axis and q-axis voltage command values v*d and v*q, and perform axis conversion.

First, the axis conversion unit 550 may perform conversion from a two-phase rotating coordinate system into a two-phase stationary coordinate system. At this time, the position ($\hat{\omega}_r$) calculated by the speed calculator 520 may be used. Then, the axis conversion unit 550 may perform conversion from the two-phase stationary coordinate system into a three-phase stationary coordinate system. Through this conversion, the axis conversion unit 550 may output a three-phase output voltage command value v*a, v*b, and v*c.

The switching control signal output unit 560 may generate and output the inverter switching control signal Sic according to a pulse width modulation (PWM) method based on the three-phase output voltage command value v*a, v*b, and v*c. The output inverter switching control signal Sic may be converted into a gate drive signal in a gate driver (not shown) and input to a gate of each switching element in the inverter 420. Thus, the respective switching elements Sa, S'a, Sb, S'b, Sc, and S'c in the inverter 420 may perform a switching operation.

Meanwhile, in accordance with the present application, during the speed increase of the motor 230 by the start of the motor 230, depending on a difference between the valve-on time of the mechanical expansion valve 132 and the refrigerant discharge time of the compressor 112, the level of the output current flowing in the motor 230 may increase rapidly.

In order to prevent this, the inverter controller 430 according to an embodiment of the present application may increase the speed of the motor 230 by starting the motor 230 and may control the speed increase of the motor 230 to change based on an increasing slope of the output current io detected by the output current detection unit E during the speed increase of the motor 230.

In particular, when the level of the output current io detected by the output current detection unit E is equal to or greater than a reference value Iref during the speed increase of the motor 230, the inverter controller 430 may control the slope of the speed increase of the motor 230 to be decreased based on the increasing slope of the output current io detected by the output current detection unit E.

Meanwhile, when the level of the output current io detected by the output current detection unit E is equal to or greater than the reference value Iref during the speed increase of the motor 230, the inverter controller 430 may control the slope of the speed increase of the motor 230 to be sequentially decreased based on the increasing slope of the output current io detected by the output current detection unit E.

Meanwhile, as the increasing slope of the output current io detected by the output current detection unit E increases, the inverter controller 430 may control the slope of the speed increase of the motor 230 to be sequentially decreased while controlling the change amount of the slope of the speed to become smaller.

Meanwhile, when the level of the output current io detected by the output current detection unit E is equal to or greater than the reference value Iref during the speed increase of the motor 230, the inverter controller 430 may control the slope of the speed increase of the motor 230 to become a second slope SL2, which is lower than a first slope SL1, from the first slope SL1 during a first interval Da, and to become a third slope SL3 lower than the second slope SL2 during a second interval Db after the first interval Da.

Meanwhile, when the level of the output current io detected by the output current detection unit E is equal to or greater than the reference value Iref during the speed increase of the motor 230, the inverter controller 430 may control the increasing slope of the output current to become a second slope SL2, which is lower than a first slope SL1, from the first slope SL1 during a first interval Da, and to become a third slope SL3 lower than the second slope SL2 during a second interval Db after the first interval Da.

Meanwhile, the inverter controller 430 may calculate a first period Z in which the output current reaches a tolerance value Ita based on the DC terminal voltage detected by the DC terminal voltage detection unit and the rotor position of the motor 230, and may calculate the slope of the speed increase of the motor 230 based on the calculated first period Z.

To this end, the inverter controller 430 may be provided with a timing calculator 482 to calculate the first period Z in which the output current reaches the tolerance value Ita based on the DC terminal voltage detected by the DC terminal voltage detection unit and the rotor position of the motor 230, and a speed slope calculator 484 to calculate the slope of the speed increase of the motor 230 based on the calculated first period Z.

Accordingly, the current command generator 530 may generate the current command value i*q, i*q based on the calculated slope of the speed increase of the motor 230 and the speed command value. Meanwhile, the speed slope calculator 484 may control the slope of the speed increase of the motor 230 to be decreased as the calculated first period Z decreases.

Meanwhile, the speed slope calculator 484 may control the slope of the speed increase of the motor 230 to be gradually decreased as the calculated first period Z decreases. Meanwhile, the speed slope calculator 484 may control the slope of the speed increase of the motor 230 to become a second slope SL2, which is lower than a first slope SL1, from the first slope SL1 during a first interval Da, and to become a third slope SL3 lower than the second slope SL2 during a second interval Db after the first interval Da.

Meanwhile, the speed slope calculator 484 in the inverter controller 430 may control the slope of the speed increase of the motor 230 to be decreased, as a difference between the valve-on time of the mechanical expansion valve 132 and the refrigerant discharge time of the compressor 112 increases. Meanwhile, the speed slope calculator 484 in the inverter controller 430 may control the slope of the speed increase of the motor 230 to be increased when the weak field control is performed during the speed increase of the motor 230.

Figure 8A:
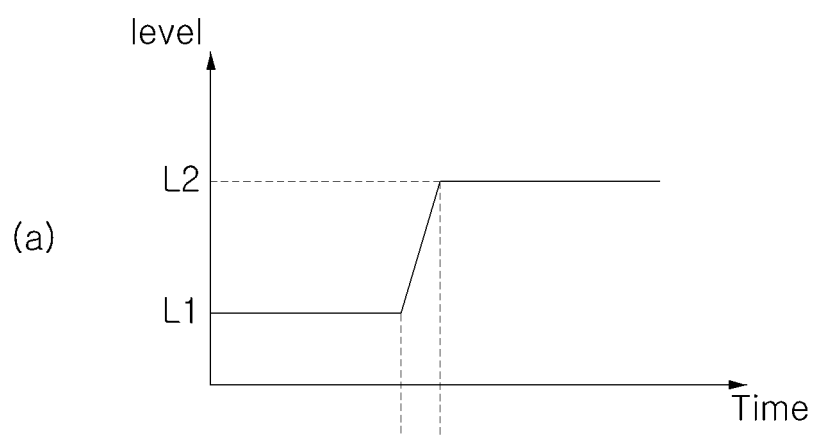
Figure 8A:
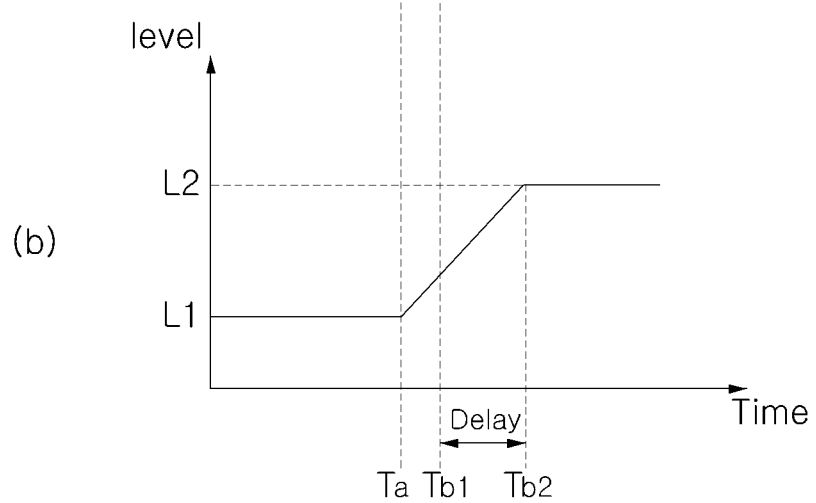
Figure 8B:
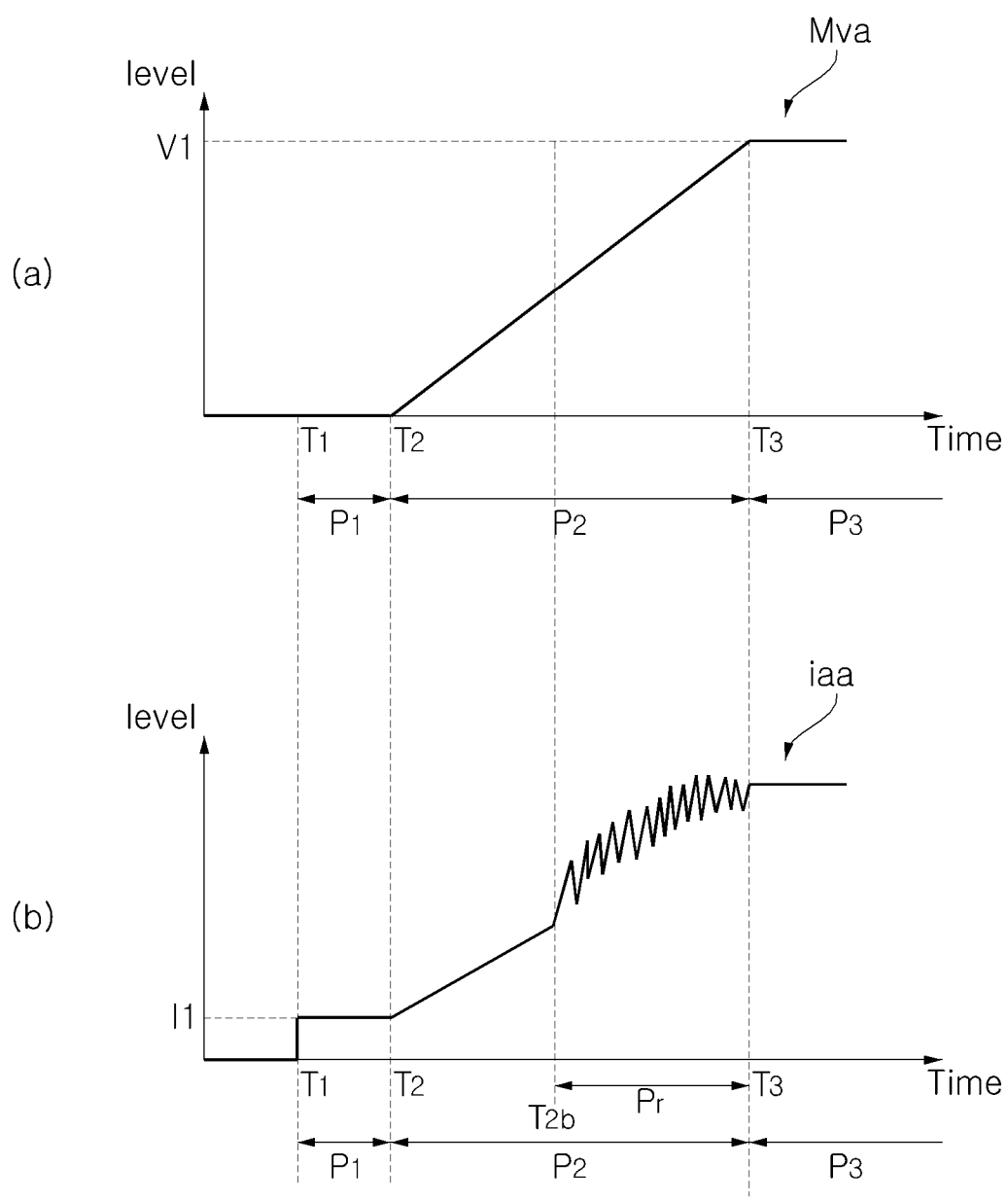

FIG. 8A and FIG. 8B are diagrams referenced in a description of an operation of a compressor and a mechanical expansion valve. First, FIG. 8A is a diagram illustrating an operation timing of the compressor 112 and the mechanical expansion valve 132.

FIG. 8A, section (a) is a diagram illustrating the refrigerant discharge timing of the compressor 112. Referring to the drawing, it is illustrated that a refrigerant discharge control signal is inputted at the time of Ta and an actual refrigerant is discharged at the time of Tb1.

FIG. 8A, section (b) is a diagram illustrating an operation timing of the mechanical expansion valve 132. Referring to the drawing, it is illustrated that an expansion control signal for operation of the mechanical expansion valve 132 is input at the time of Ta, and an actual mechanical expansion valve 132 is expanded at the time of Tb2.

Referring to FIG. 8A, even when the operation timing signals of the compressor 112 and the mechanical expansion valve 132 are simultaneously applied at Ta, the actual operation timing of the mechanical expansion valve 132 is slow. Therefore, as shown in FIG. 8A, a delay which is a difference between Tb1 and Tb2 occurs.

FIG. 8B illustrates that the output current iaa flowing in the motor rises rapidly due to the delay of FIG. 8A during the speed increase of the motor. Referring to FIG. 8B, a motor alignment control for aligning the motor 230 may be performed during a P1 period between the time T1 and the time T2 when the motor 230 is started.

Accordingly, although a motor speed Mva is 0, a certain current I1 may actually flow in the motor 230, and the rotor of the motor 230 may be aligned at a certain position. Next, the speed of the motor 230 may continuously increase during a P2 period between the time T2 and the time T3. Next, during a period P3 after the time T3, the motor 230 may rotate at a constant speed V1.

Meanwhile, during the period P2, as described in FIG. 8A, due to the delay which is the difference of the actual operating time between the compressor 112 and the mechanical expansion valve 132, the refrigerant from the compressor 112 is not discharged or expanded as the expansion valve does not operate, so that the output current flowing in the motor of the compressor 112 may increase rapidly. FIG. 8B, section (b) illustrates that the output current iaa flowing in the motor of the compressor 112 rises rapidly during a Pr period from the time T2b to the time T3.

Figure 9:
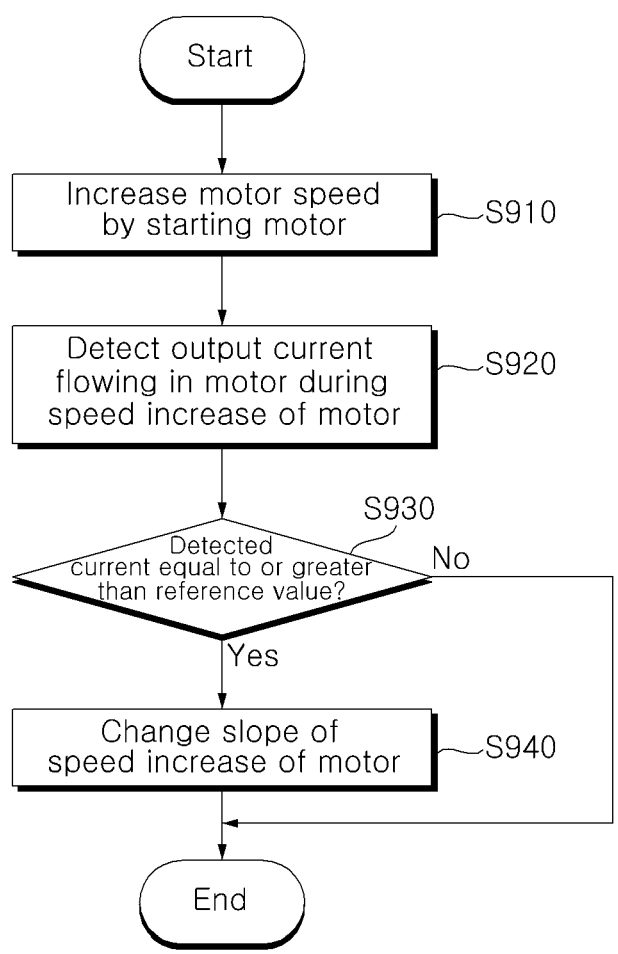
FIG. 9 is a flowchart illustrating an operation method of a compressor driving apparatus according to an embodiment of the present application.

In the present application, a method of reducing the rapid increasing of the output current (iaa) flowing in the motor of the compressor 112 is proposed. This shall be described with reference to FIG. 9 to FIG. 11. FIG. 9 is a flowchart illustrating an operation method of a compressor driving apparatus according to an embodiment of the present application, and FIGS. 10A to 11C are diagrams referenced in a description of the operation method of FIG. 9.

Referring to FIG. 9, the inverter controller 430 in the compressor driver 113 may control the motor speed to be increased by starting the motor (S910). For example, the inverter controller 430 in the compressor driver 113 may control the motor speed to be increased at a constant increasing slope such as the period P2 between T2 and T3 of FIG. 8B.

The output current detection unit E in the compressor driver 113 may detect the output current flowing in the motor during the speed increase of the motor (S920). The detected output current may be input to the inverter controller 430. The inverter controller 430 in the compressor driving apparatus 113 may determine whether the detected output current is equal to or greater than the reference value Iref (S930). Then, in the case of the reference value or more, the inverter controller 430 in the compressor driving apparatus 113 varies the slope of the speed increase of the motor (S940).

Meanwhile, according to the present application, during the speed increase of the motor 230 by the start of the motor 230, depending on the difference between the valve-on time of the mechanical expansion valve 132 and the refrigerant discharge time of the compressor 112, the level of the output current flowing in the motor 230 may increase rapidly.

Figure 10A:
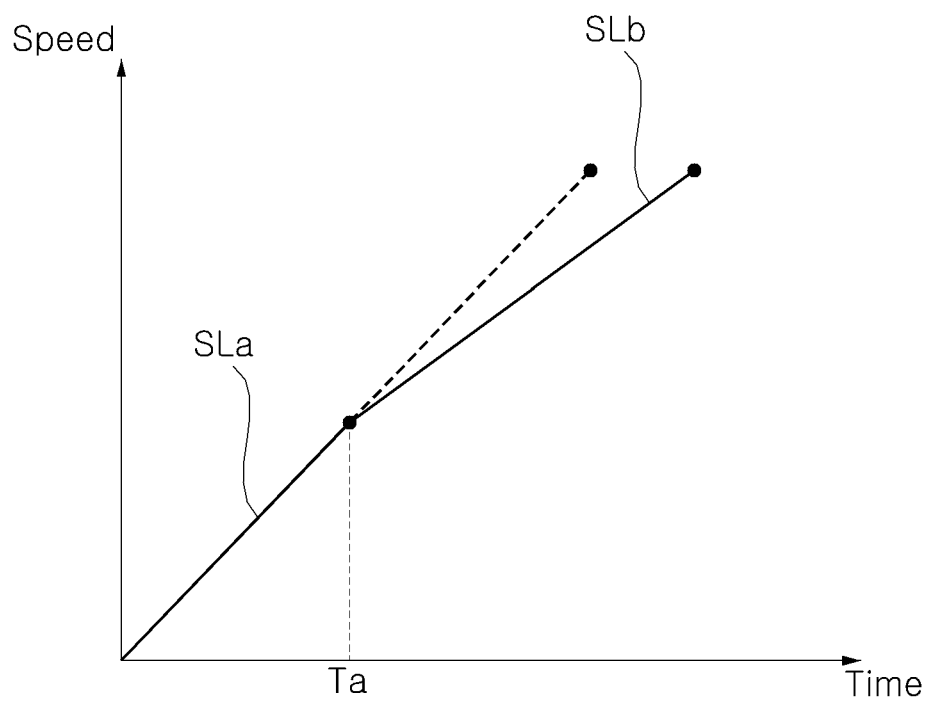

In order to prevent this, when the level of the output current io detected by the output current detection unit E is equal to or greater than the reference value Iref during the speed increase of the motor 230, the inverter controller 430 according to the embodiment of the present application may control the slope of the speed increase of the motor 230 to be decreased, as shown in FIG. 10A, based on the increasing slope of the output current io detected by the output current detection unit E.

FIG. 10A illustrates that the slope of the speed increase of the motor is SLa during the speed increase of the motor 230, and the slope of the speed increase of the motor 230 is decreased from the time Ta so that the slope of the speed increase of the motor is SLb which is lower than SLa. Thus, it is possible to reduce a rapid increasing in the output current io flowing in the compressor motor 230. That is, it is possible to reduce the rapid increasing of the output current io in the Pr period of FIG. 8B.

FIG. 10B illustrates that the slope of the speed increase of the motor is SLa during the speed increase of the motor, and the slope of the speed increase of the motor 230 is increased from the time Tb so that the slope of the speed increase of the motor is SLc which is higher than SLa.

For example, when the weak field control is performed during the speed increase of the motor 230, by using a maximum voltage of the DC terminal voltage, the speed slope calculator 484 in the inverter controller 430 may control the slope of the speed increase of the motor 230 to be further increased in a state in which the motor rotates. In this case, the level of the output current io detected by the output current detection unit E may be lower than the reference value Iref.

Meanwhile, when the level of the output current io detected by the output current detection unit E is equal to or greater than the reference value Iref during the speed increase of the motor 230, the inverter controller 430 may control the slope of the speed increase of the motor 230 to be sequentially decreased based on the increasing slope of the output current io detected by the output current detection unit E.

The inverter controller 430 may control the slope of the speed increase of the motor 230 to be sequentially decreased as the increasing slope of the output current io detected by the output current detection unit E increases during the speed increase of the motor 230, while controlling the change amount of the slope of the speed to become smaller.

Meanwhile, when the level of the output current io detected by the output current detection unit E is equal to or greater than the reference value Iref during the speed increase of the motor 230, the inverter controller 430 may control the slope of the speed increase of the motor 230 to become a second slope SL2, which is lower than a first slope SL1, from the first slope SL1 during the first interval Da, and to become a third slope SL3 lower than the second slope SL2 during a second interval Db after the first interval Da.

Meanwhile, when the level of the output current io detected by the output current detection unit E is equal to or greater than the reference value Iref during the speed increase of the motor 230, the inverter controller 430 may control the increasing slope of the output current to become a second slope SL2, which is lower than a first slope SL1, from the first slope SL1 during a first interval Da, and to become a third slope SL3 lower than the second slope SL2 during a second interval Db after the first interval Da.

Meanwhile, the speed slope calculator 484 may control the slope of the speed increase of the motor 230 to be decreased as the calculated first period Z decreases. Meanwhile, the speed slope calculator 484 may control the slope of the speed increase of the motor 230 to be gradually decreased as the calculated first period Z decreases.

Meanwhile, the speed slope calculator 484 may control the slope of the speed increase of the motor 230 to become a second slope SL2, which is lower than a first slope SL1, from the first slope SL1 during a first interval Da, and to become the third slope SL3 lower than the second slope SL2 during a second interval Db after the first interval Da.

Meanwhile, the speed slope calculator 484 in the inverter controller 430 may control the slope of the speed increase of the motor 230 to be decreased, as a difference between the valve-on time of the mechanical expansion valve 132 and the refrigerant discharge time of the compressor 112 increases. This shall be described with reference to FIG. 11A to FIG. 11C.

Figure 11A:
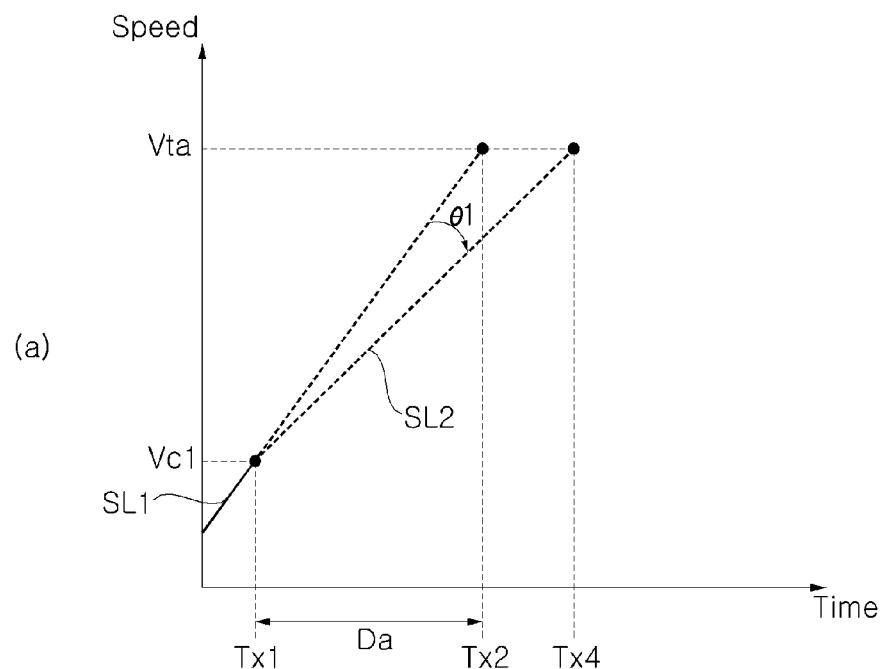
Figure 11A:
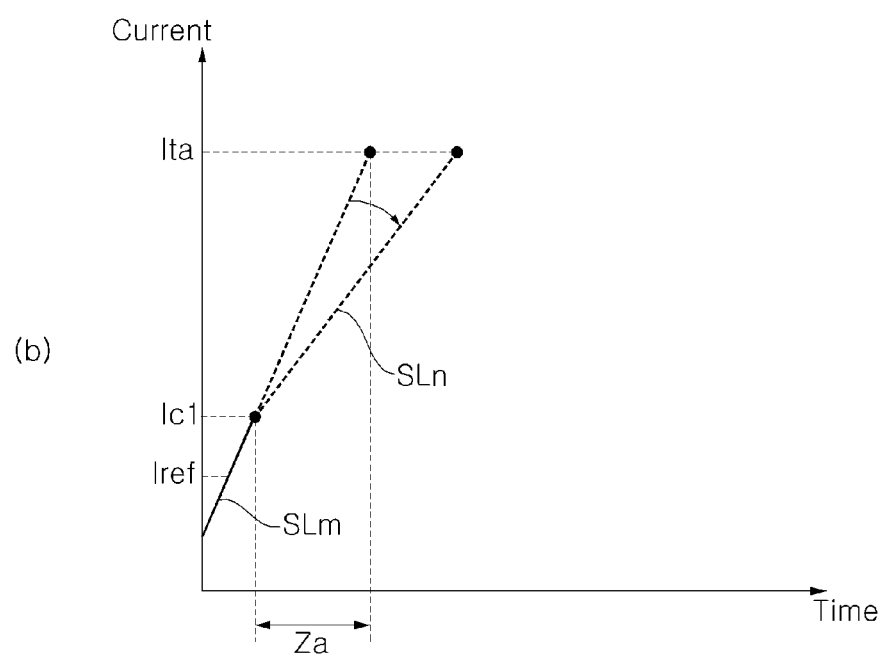

FIG. 11A, section (a) illustrates a graph of a speed of the motor, and FIG. 11A, section (b) illustrates a graph of an output current of the motor. Referring to the drawing, the speed of the motor may increase until the time Tx1, and the slope of the speed increase of the motor 230 may be the first slope SL1.

Meanwhile, when the level of the output current io is already equal to or greater than the reference value Iref at the time Tx1, the inverter controller 430 may control the slope of the speed increase of the motor 230 to be decreased. That is, as shown in the drawing, during the interval Da from Tx1 to Tx2, the inverter controller 430 may control the slope of the speed increase of the motor 230 to be decreased from the first slope SL1 to the second slope SL2. Meanwhile, in FIG. 11A, the change amount of slope may be θ1.

Accordingly, during interval Da from Tx1 to Tx2, the increasing slope of the output current of the motor 230 may become smaller from SLm to SLn. Meanwhile, the inverter controller 430 may calculate the first period Z in which the output current reaches the tolerance value Ita, may determine that the output current increases rapidly as the calculated first period Z decreases, and may control the slope of the speed increase of the motor 230 to be decreased. FIG. 11A, section (b) illustrates that the calculated first period is Za.

Figure 11B:
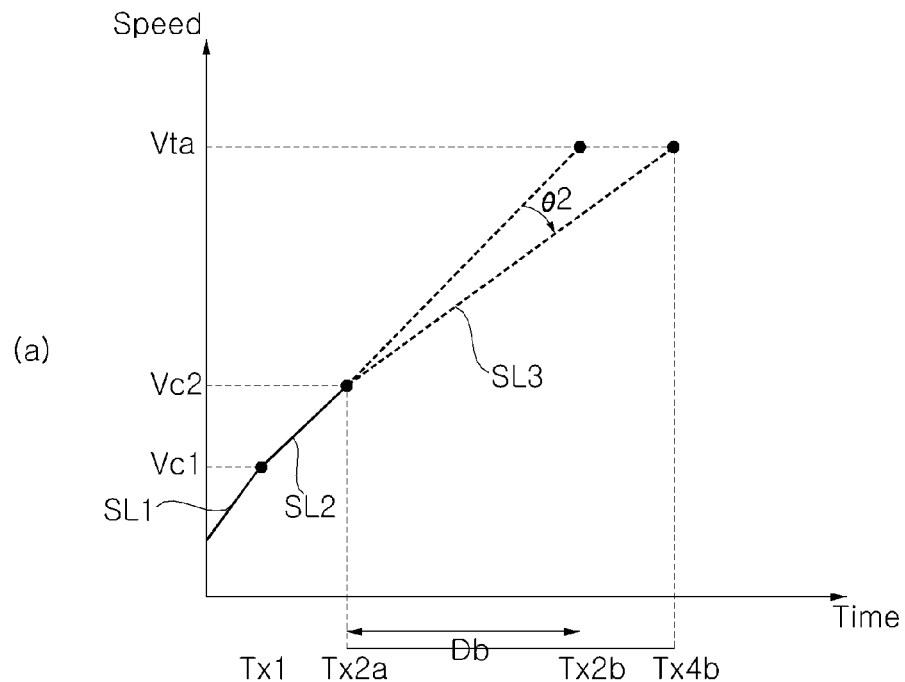
Figure 11B:
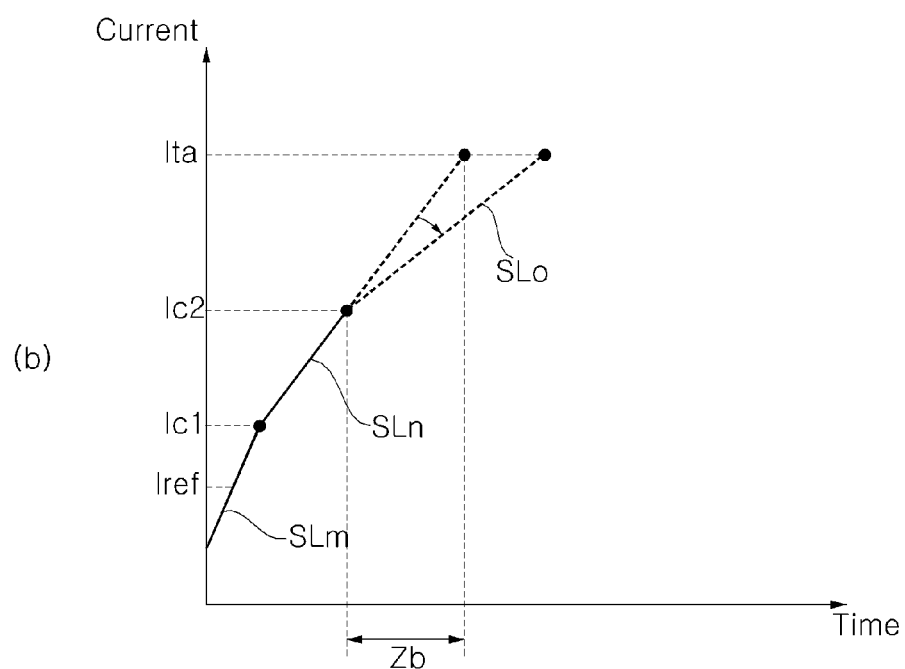

FIG. 11B, section (a) shows a graph of the speed of the motor, and FIG. 11B, section (b) shows a graph of the output current of the motor. Referring to the drawing, the speed of the motor may increase until the time Tx1, and the slope of the speed increase of the motor 230 may be the first slope SL1, and the slope of the speed increase of the motor 230 may be the second slope SL2 during the interval Da from Tx1 to Tx2.

Meanwhile, when the level of the output current io is already equal to or greater than the reference value Iref at the time Tx1, the inverter controller 430 may control the slope of the speed increase of the motor 230 to be decreased. That is, as shown in the drawing, during the interval Db from Tx2a to Tx2b, the inverter controller 430 may control the slope of the speed increase of the motor 230 to be decreased from the second slope SL2 to the third slope SL3. Meanwhile, in FIG. 11B, the change amount of slope may be θ2 smaller than θ1.

Accordingly, during the interval Db from Tx2a to Tx2b, the increasing slope of the output current of the motor 230 may become smaller from SLn to SL0. Meanwhile, the inverter controller 430 may calculate the first period Z in which the output current reaches the tolerance value Ita, may determine that the output current increases rapidly as the calculated first period Z decreases, and may control the slope of the speed increase of the motor 230 to be decreased.

FIG. 11B, section (b) illustrates that the calculated first period is Zb longer than Za. That is, the first period Z in which the output current reaches the tolerance value Ita becomes longer as the slope of the speed increase of the motor 230 is decreased.

Figure 11C:
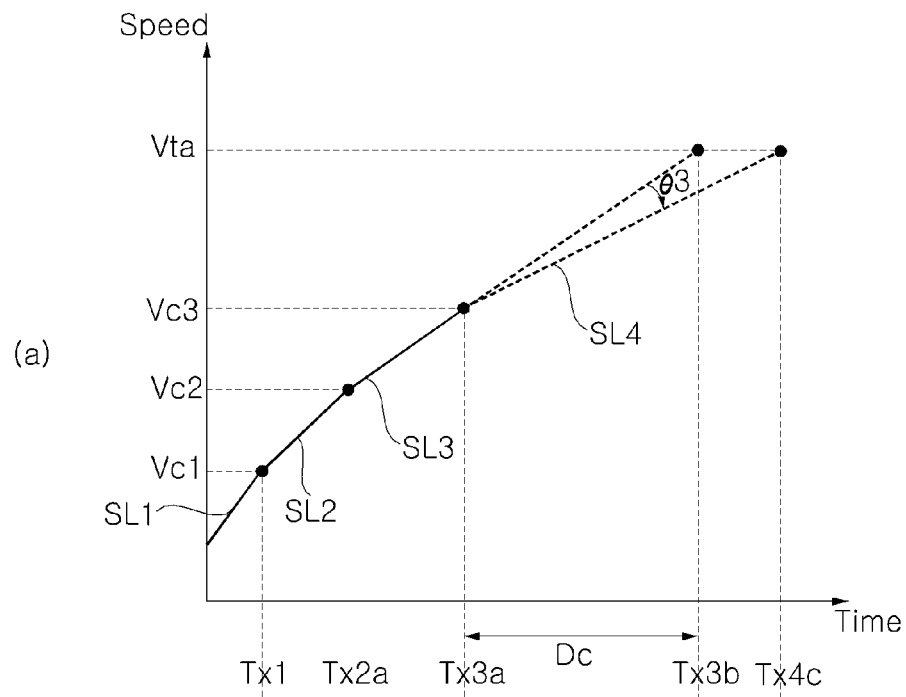
Figure 11C:
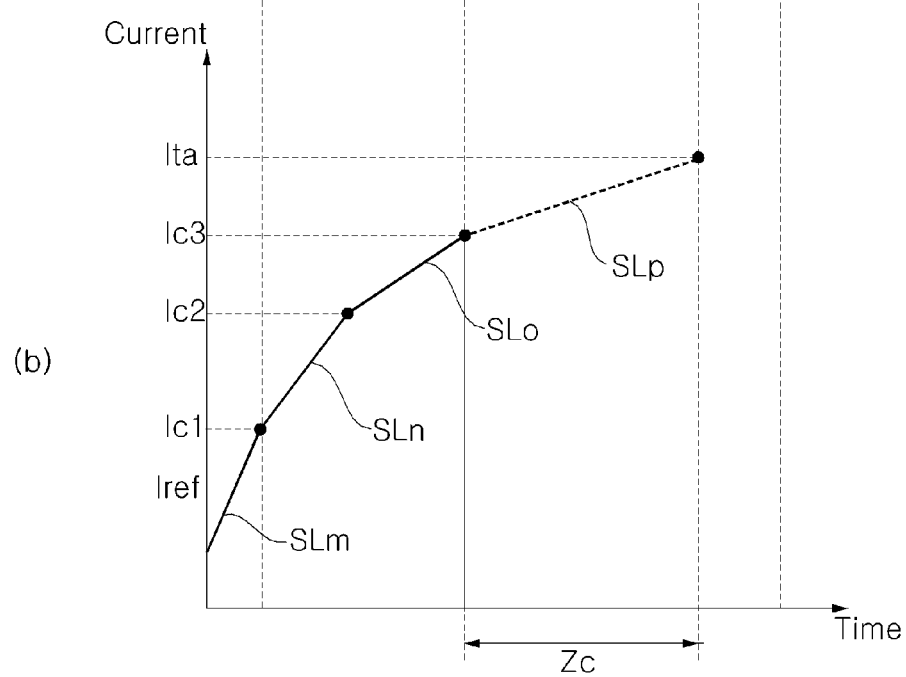

FIG. 11C, section (a) shows a graph of the speed of the motor, and FIG. 11C(b) shows a graph of the output current of the motor. Referring to the drawing, the speed of the motor may increase until the time Tx1, and the slope of the speed increase of the motor 230 may be the first slope SL1, the slope of the speed increase of the motor 230 may be the second slope SL2 during the interval Da from Tx1 to Tx2, and the slope of the speed increase of the motor 230 may be the third slope SL3 during the interval Db from Tx2 to Tx3.

Meanwhile, when the level of the output current io is already equal to or greater than the reference value Iref at the time Tx1, the inverter controller 430 may control the slope of the speed increase of the motor 230 to be decreased. That is, as shown in the drawing, during the interval Dc from Tx3a to Tx3b, the inverter controller 430 may control the slope of the speed increase of the motor 230 to be decreased from the third slope SL3 to a fourth slope SL4. Meanwhile, in FIG. 11C, the change amount of slope may be θ3 smaller than θ2.

Accordingly, during the interval Dc from Tx3a to Tx3b, the increasing slope of the output current of the motor 230 may become smaller from SL0 to SLp. Meanwhile, the inverter controller 430 may calculate the first period Z in which the output current reaches the tolerance value Ita, may determine that the output current increases rapidly as the calculated first period Z decreases, and may control the slope of the speed increase of the motor 230 to be decreased.

FIG. 11C, section (b) illustrates that the calculated first period is Zc. As described above, according to FIG. 11A to FIG. 11C, when the level of the output current io is equal to or greater than the reference value Iref during the speed increase of the motor, the speed increase of the motor 230 may be varied, and in particular, the slope of the speed increase of the motor 230 may be decreased, so that a rapid increase in the output current flowing in the compressor motor 112 during the speed increase of the compressor motor 112 can be reduce.

Particularly, in the compressor driving apparatus 113 of a home appliance having the mechanical expansion valve 132 and the compressor 112, the rapid increase of the output current, which is generated due to the operation time difference between the mechanical expansion valve 132 and the compressor 112, flowing in the motor 230 of the compressor 112 may be reduced. Particularly, by controlling the slope of the speed increase of the motor 230 to be sequentially decreased, the rapid increase of the output current flowing in the motor 230 of the compressor 112 during the speed increase of the motor 230 of the compressor 112 may be reduced.

In addition, by controlling the slope of the speed increase of the motor 230 to be sequentially decreased while controlling the change amount of the slope of the speed to become smaller, the rapid increase of the output current flowing in the motor 230 of the compressor 112 during the speed increase of the motor 230 of the compressor 112 may be reduced.

Meanwhile, by controlling the slope of the speed increase of the motor 230 to be further decreased as the difference between the valve-on time of the mechanical expansion valve 132 and the refrigerant discharge time of the compressor 112 increases, the rapid increase of the output current flowing in the motor 230 of the compressor 112 during the speed increase of the motor 230 of the compressor 112 may be reduced.

Figure 12:
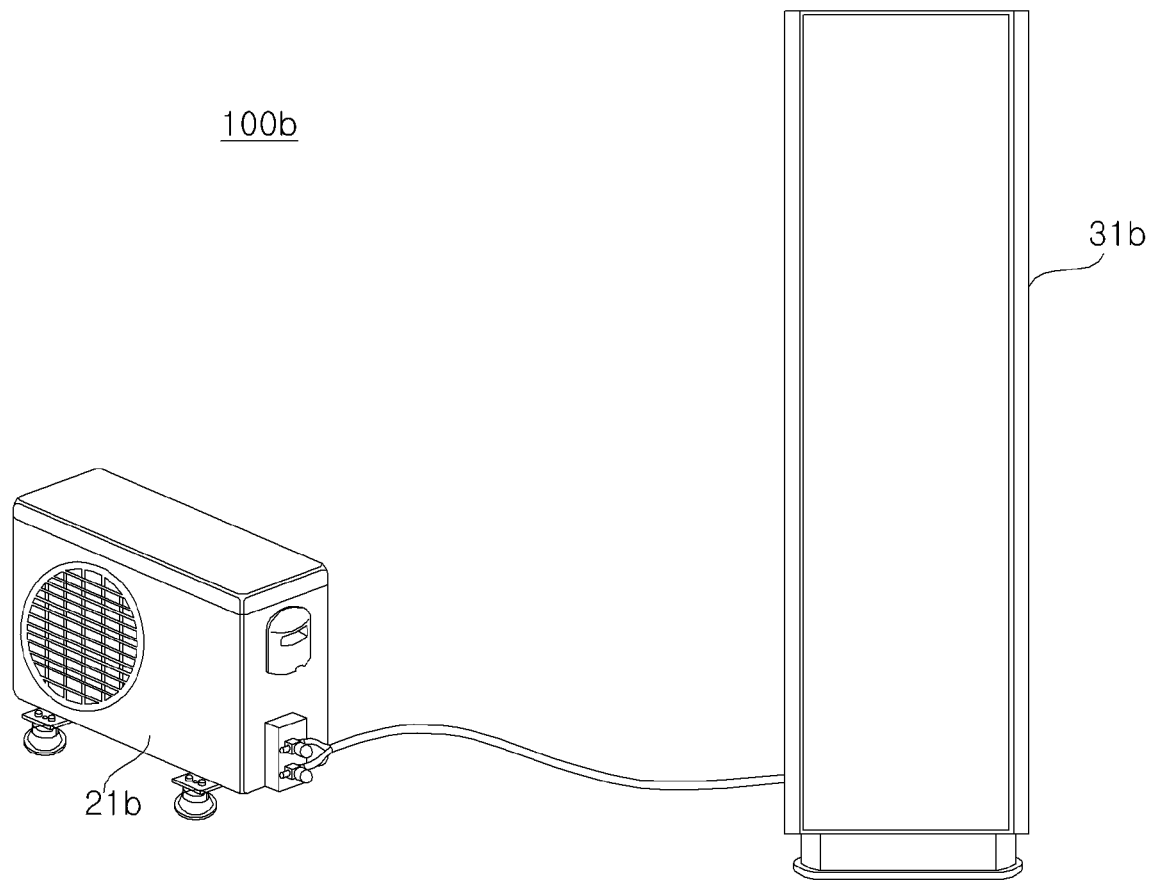
FIG. 12 is a diagram illustrating a configuration of an air conditioner that is another example of a home appliance according to an embodiment of the present application.

FIG. 12 is a diagram illustrating a configuration of an air conditioner that is another example of a home appliance according to an embodiment of the present application. As shown in FIG. 12, the air conditioner 100b according to the present application may include an indoor unit 31b and an outdoor unit 21b connected to the indoor unit 31b.

The indoor unit 31b of the air conditioner may be applicable to any of a stand-type air conditioner, a wall-mounted type air conditioner, and a ceiling-type air conditioner, but, in the drawing, the stand type indoor unit 31b is illustrated. Meanwhile, the air conditioner 100b may further include at least one of a ventilator, an air cleaner, a humidifier, and a heater, and may operate in conjunction with the operation of the indoor unit and the outdoor unit.

The outdoor unit 21b may include a compressor (not shown) to receive and compress refrigerant, an outdoor heat exchanger (not shown) to exchange heat between the refrigerant and outdoor air, an accumulator to extract gas refrigerant from the supplied refrigerant and supply it to the compressor, and a four-way valve (not shown) to select a flow path of the refrigerant according to a heating operation. In addition, a number of sensors, a valve, an oil recovery device, and the like may be further included, but a description of the configuration thereof shall be omitted.

The outdoor unit 21b may operate the compressor and the outdoor heat exchanger to compress the refrigerant or heat-exchange according to the setting and supply the refrigerant to the indoor unit 31b. The outdoor unit 21b may be driven by the demand of a remote controller (not shown) or the indoor unit 31b. At this time, the number of operation of the outdoor units and the number of operation of the compressors installed in the outdoor unit can change as the cooling/heating capacity is changed depending on the driven indoor unit.

At this time, the outdoor unit 21b may supply the compressed refrigerant to the connected indoor unit 310b. The indoor unit 310b may receive the refrigerant from the outdoor unit 21b and discharge cold air to a room. The indoor unit 31b may include an indoor heat exchanger (not shown), an indoor unit fan (not shown), an expansion valve (not shown) to expand the supplied refrigerant, and a plurality of sensors (not shown). Here, the expansion valve (not shown), as described above, may be a mechanical expansion valve.

At this time, the outdoor unit 21b and the indoor unit 31b may be connected to each other via a communication line to transmit and receive data, and the outdoor unit and the indoor unit may be connected to a remote controller (not shown) by wire or wirelessly, and may operate under the control of the remote controller (not shown).

The remote controller (not shown) may be connected to the indoor unit 31b, input a control command of a user to the indoor unit, and receive and display status information of the indoor unit. At this time, the remote controller may communicate by wire or wirelessly according to a connection type with the indoor unit.

Figure 13:
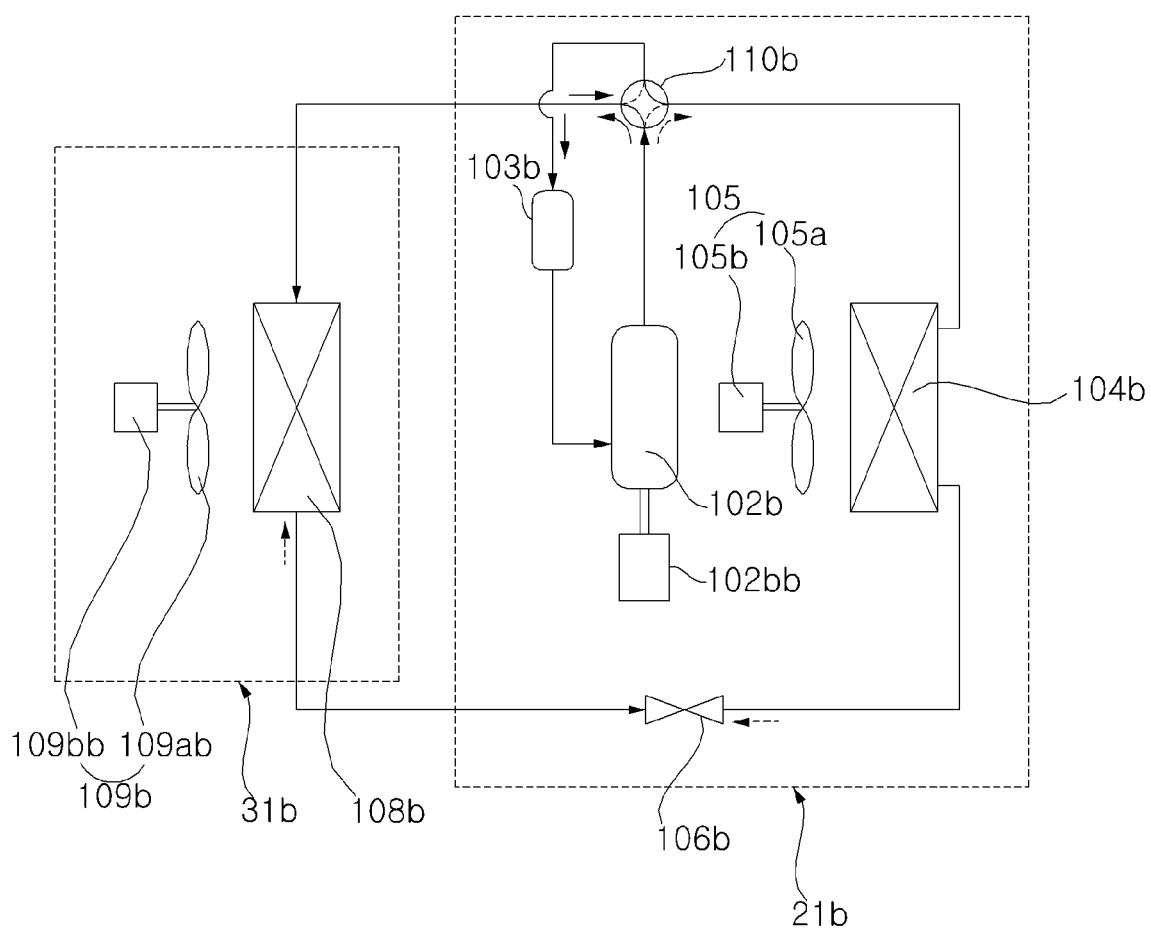
FIG. 13 is a schematic diagram of an outdoor unit and an indoor unit of FIG. 12.

FIG. 13 is a schematic diagram of the outdoor unit and the indoor unit of FIG. 12. With reference to the drawing, the air conditioner 100b may be roughly divided into the indoor unit 31*b* and the outdoor unit 21*b*. The outdoor unit 21*b* may include a compressor 102*b* to compress refrigerant, a compressor motor 102*bb* to drive the compressor, an outdoor heat exchanger 104*b* to dissipate heat of the compressed refrigerant, an outdoor air blower 105 provided with an outdoor fan 105*ab* that is disposed in one side of the outdoor heat exchanger 104*b* and accelerates the heat dissipation of the refrigerant and a motor 105*b* to rotate the outdoor fan 105*ab*, an expansion mechanism 106*b* to expand the condensed refrigerant, a cooling/heating switching valve 110*b* to change a flow path of the compressed refrigerant, an accumulator 103*b* to temporarily store a gasified refrigerant to remove moisture and foreign substances and then supply a refrigerant of a constant pressure to the compressor, and the like.

The indoor unit 31*b* may include an indoor heat exchanger 108*b* that is disposed inside the room and serves to perform a cooling/heating, an indoor air blower 109*b* provided with an indoor fan 109*ab* that is disposed in one side of the indoor heat exchanger 108*b* and accelerates the heat dissipation of the refrigerant and a motor 109*bb* to rotate the indoor fan 109*ab*, and the like.

At least one indoor heat exchanger 108*b* may be installed. At least one of an inverter compressor and a constant speed compressor may be used as the compressor 102*b*. Further, the air conditioner 100*b* may be constituted by a cooler to cool the room, or by a heat pump to cool or heat the room.

The compressor 102*b* in the outdoor unit 21*b* of FIG. 13 may be driven by the compressor driving apparatus 113 as shown in FIG. 6. Specifically, the compressor motor 102*bb* of FIG. 13 may be driven by the compressor driving apparatus 113 as shown in FIG. 6. Accordingly, the description of FIG. 6 to FIG. 11C may be applicable to the air conditioner 100*b*.

The compressor driving apparatus and the home appliance including the same according to the foregoing embodiments are not restricted to the configuration and method of the embodiments set forth herein. Therefore, some or all of the above-described embodiments may be selectively combined to make various modifications.

The method of operating the compressor driving apparatus and the home appliance according to the foregoing embodiments may be implemented as code that can be written to a processor-readable recording medium included in the compressor driving apparatus or the home appliance and can thus be read by a processor. The processor-readable recording medium may be any type of recording device in which data can be stored in a processor-readable manner. Examples of the processor-readable recording medium include a ROM, a RAM, a CD-ROM, a magnetic tape, a floppy disk, optical data storage, and a carrier wave (e.g., data transmission over the Internet). The processor-readable recording medium may be distributed over a plurality of computer systems connected to a network so that processor-readable code is written thereto and executed therefrom in a decentralized manner.

An embodiment may be achieved in a whole or in parts by a compressor driving apparatus and the home appliance including the same that include a DC terminal capacitor to store a direct current power, an inverter to convert the direct current power of both ends of the DC terminal capacitor into an alternating current power and output the alternating current power to a motor, an output current detection unit to detect an output current flowing in the motor, and an inverter control unit to increase a motor speed by starting the motor, and control a speed increase of the motor to vary based on an increasing slope of an output current detected by the output current detection unit during the speed increase of the motor. Accordingly, a rapid increase of the output current flowing in the motor of the compressor during the speed increase of the motor of the compressor can be reduced.

In particular, in the compressor driving apparatus of the home appliance having a mechanical expansion valve and a compressor, a rapid increase of the output current, which is generated due to an operation time difference between the mechanical expansion valve and the compressor, flowing in the motor of the compressor can be reduced.

Meanwhile, when a level of the output current detected by the output current detection unit is equal to or greater than a reference value during the speed increase of the motor, by controlling the slope of the speed increase of the motor to be sequentially decreased based on the increasing slope of the output current detected by the output current detection unit, the rapid increase of the output current flowing in the motor of the compressor during the speed increase of the motor of the compressor can be reduced.

Meanwhile, as the increasing slope of the output current detected by the output current detection unit increases, by controlling the slope of the speed increase of the motor to be sequentially decreased while controlling the change amount of the slope of the speed to become smaller, the rapid increase of the output current flowing in the motor of the compressor during the speed increase of the motor of the compressor can be reduced.

Meanwhile, by calculating a first period in which the output current reaches a tolerance value based on the DC terminal voltage detected by the DC terminal voltage detection unit and a rotor position of the motor, and by controlling the slope of the speed increase of the motor to be decreased as the calculated first period decreases, the rapid increase of the output current flowing in the motor of the compressor during the speed increase of the motor of the compressor can be reduced.

Meanwhile, by controlling the slope of the speed increase of the motor to be decreased as a difference between the valve-on time of the mechanical expansion valve and the refrigerant discharge time of the compressor increases, the rapid increase of the output current flowing in the motor of the compressor during the speed increase of the motor of the compressor can be reduced.

Aspects of the present application provide a compressor driving apparatus capable of reducing a rapid increasing of an output current flowing in a compressor motor during a speed increasing in the compressor motor, and a home appliance including the compressor driving apparatus.

Another aspect of the present application provides a compressor driving apparatus capable of easily performing input current estimation in a compressor driving apparatus not provided with an input current detecting unit, and a home appliance including the compressor driving apparatus.

In accordance with an aspect of the present application, a compressor driving apparatus of a home appliance having a mechanical expansion valve and a compressor includes a DC terminal capacitor to store a direct current power, an inverter to convert the direct current power of both ends of the DC terminal capacitor into an alternating current power and output the alternating current power to a motor, an output current detection unit to detect an output current flowing in the motor, and an inverter controller to increase a motor speed by starting the motor, and control a speed increase of the motor to change based on an increasing slope of an output current detected by the output current detection unit during the speed increase of the motor.

In accordance with another aspect of the present application, a home appliance includes a DC terminal capacitor to store a direct current power, an inverter to convert the direct current power of both ends of the DC terminal capacitor into an alternating current power and output the alternating current power to a motor, an output current detection unit to detect an output current flowing in the motor, and an inverter controller to increase a motor speed by starting the motor, and control a speed increase of the motor to change based on an increasing slope of an output current detected by the output current detection unit during the speed increase of the motor.

Although the preferred embodiments of the present application have been disclosed for illustrative purposes, those skilled in the art will appreciate that various modifications, additions and substitutions are possible, without departing from the scope and spirit of the application as disclosed in the accompanying claims. Such modifications should not be individually understood from the technical spirit or prospect of the present application It will be understood that when an element or layer is referred to as being another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present application.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A compressor drive of a home appliance having a mechanical expansion valve and a compressor, the compressor drive comprising:
    a capacitor that stores a charge;
    an inverter that converts direct current associated with the stored charge of the capacitor into alternating current based on a switching control signal, and outputs the alternating current toward a motor;
    output current detection circuitry that generates an output current based on the alternating current flowing between the inverter and the motor; and
    an inverter controller that generates the switching control signal to:
        start the motor, and
        control a speed increase of the started motor based on a slope associated with a change in the output current from the output current detection circuitry during the speed increase of the motor,
    wherein the inverter controller manages the switching control signal such that a slope associated with the speed increase of the motor is decreased as a difference between a valve-on time of the mechanical expansion valve and a refrigerant discharge time of the compressor increases.

2. Circuitry to drive a compressor in a home appliance, the circuitry comprising:

a direct current source that provides a direct current;
an inverter that converts the direct current into alternating current based on a switching control signal, and outputs the alternating current to a motor of the compressor;
output current detection circuitry that generates an output current based on the alternating current between the inverter and the motor; and
an inverter controller that generates the switching control signal to start the motor and to control a speed increase of the motor based on a rate of a change over time associated with the output current from the output current detection circuitry during the speed increase of the motor,
wherein the inverter controller manages the switching control signal such that a rate of change over time associated with the speed increase of the motor is decreased based on the rate of change over time associated with the output current from the output current detection circuitry when the output current is equal to or greater than a reference value during the speed increase of the motor.

3. The compressor drive of claim 1, wherein the inverter controller manages the switching control signal such that a slope associated with the speed increase of the motor is sequentially decreased based on the slope associated with the change in the output current from the output current detection circuitry when the output current is equal to or greater than a reference value during the speed increase of the motor.

4. The compressor drive of claim 1, wherein the inverter controller manages the switching control signal such that:
a slope associated with the speed increase of the motor is sequentially decreased as the slope associated with the change in the output current from the output current detection circuitry increases, and
a change of the slope associated with the speed increase becomes smaller.

5. The compressor drive of claim 1, wherein the inverter controller manages the switching control signal such that:
a slope associated with the speed increase of the motor switches from a first slope to a second slope that is higher than the first slope during a first interval, and switches to a third slope that is less than the second slope during a second interval after the first interval, when a level of the output current from the output current detection circuitry is equal to or greater than a reference value during the speed increase of the motor.

6. The compressor drive of claim 1, wherein the inverter controller manages the switching control signal such that:
the slope associated with the change in the output current switches from a first slope to a second slope that is less than the first slope during a first interval, and switches to a third slope that is less than the second slope during a second interval after the first interval, when a level of the output current from the output current detection circuitry is equal to or greater than a reference value during the speed increase of the motor.

7. The compressor drive of claim 1, further comprising a DC terminal voltage detection circuitry that detects a DC terminal voltage associated with the capacitor,
wherein the inverter controller calculates a first period in which the output current reaches a tolerance value based on the DC terminal voltage detected by the DC terminal voltage detection circuitry and a rotor position of the motor, and calculates the slope associated with a speed increase of the motor based on the calculated first period.

8. The compressor drive of claim 7, wherein the first period in which the output current reaches the tolerance value becomes longer as the slope associated with the speed increase of the motor is decreased.

9. The compressor drive of claim 7, wherein the inverter controller includes:
a timing calculator to calculate the first period in which the output current reaches the tolerance value based on the DC terminal voltage detected by the DC terminal voltage detection circuitry and the rotor position of the motor; and
a speed slope calculator to calculate the slope of the speed increase of the motor based on the calculated first period.

10. The compressor drive of claim 9, wherein the inverter controller includes:
a current command generator to generate a current command value based on the calculated slope of the speed increase of the motor and a speed command value;
a voltage command generator to generate a voltage command value based on the generated current command value; and
a switching control signal output unit to output the switching control signal to the inverter based on the voltage command value.

11. The compressor drive of claim 9, wherein the speed slope calculator decreases the slope associated with the speed increase of the motor as the calculated first period decreases.

12. The compressor drive of claim 9, wherein the speed slope calculator decreases the slope associated with the speed increase of the motor as the calculated first period decreases.

13. The compressor drive of claim 9, wherein the speed slope calculator decreases the slope associated with the speed increase of the motor from a first slope to a second slope, which is less than the first slope, during a first interval, and from the second slope to a third slope, which is less than the second slope, during a second interval after the first interval.

14. The compressor drive of claim 1, wherein the inverter controller manages the switching control signal such that a slope associated with the speed increase of the motor is increased when a weak field control is performed during the speed increase of the motor.

15. A home appliance comprising:
a mechanical expansion valve;
a compressor; and
a compressor drive that includes:
a capacitor that stores a charge;
an inverter that converts direct current associated with the stored charge of the capacitor into alternating current based on a switching control signal, and outputs the alternating current toward a motor;
output current detection circuitry that generates an output current based on the alternating current flowing between the inverter and the motor; and
an inverter controller that generates the switching control signal to:
start the motor, and
control a speed increase of the started motor based on a slope associated with a change in the output current from the output current detection circuitry during the speed increase of the motor,
wherein the inverter controller manages the switching control signal such that a slope associated with the speed increase of the motor is decreased as a difference between a valve-on time of the mechanical expansion valve and a refrigerant discharge time of the compressor increases.

16. The home appliance of claim 15, wherein the inverter controller manages the switching control signal such that a slope associated with the speed increase of the motor is decreased based on the slope associated with the change in the output current from the output current detection circuitry when the output current is equal to or greater than a reference value during the speed increase of the motor.

17. The home appliance of claim 15, wherein the inverter controller manages the switching control signal such that:
   a slope associated with the speed increase of the motor is sequentially decreased as the slope associated with the change in the output current from the output current detection circuitry increases, and
   a change of the slope associated with the speed increase becomes smaller.

18. The home appliance of claim 15, wherein the inverter controller manages the switching control signal such that:
   a slope associated with the speed increase of the motor switches from a first slope to a second slope that is higher than the first slope during a first interval, and switches to a third slope that is less than the second slope during a second interval after the first interval, when a level of the output current from the output current detection circuitry is equal to or greater than a reference value during the speed increase of the motor.

19. The home appliance of claim 15, wherein the inverter controller manages the switching control signal such that:
   the slope associated with the change in the output current switches from a first slope to a second slope that is less than the first slope during a first interval, and switches to a third slope that is less than the second slope during a second interval after the first interval, when a level of the output current from the output current detection circuitry is equal to or greater than a reference value during the speed increase of the motor.

20. The home appliance of claim 15, wherein the compressor drive further includes a DC terminal voltage detection circuitry that detects a DC terminal voltage associated with the capacitor,
   wherein the inverter controller calculates a first period in which the output current reaches a tolerance value based on the DC terminal voltage detected by the DC terminal voltage detection circuitry and a rotor position of the motor, and calculates a slope associated with the speed increase of the motor based on the calculated first period.

21. The circuitry of claim 2, wherein the direct current source includes:
   a rectifier to rectify alternating current from a voltage source; and
   a capacitor to smooth the rectified alternating current to form the direct current provided to the inverter.

* * * * *

UNITED STATES PATENT AND TRADEMARK OFFICE
CERTIFICATE OF CORRECTION

PATENT NO. : 10,641,533 B2
APPLICATION NO. : 16/139316
DATED : May 5, 2020
INVENTOR(S) : Cho et al.

Page 1 of 1

It is certified that error appears in the above-identified patent and that said Letters Patent is hereby corrected as shown below:

On the Title Page

Add item (30):
(30)   Foreign Application Priority Data
Sep. 26, 2017   (KR) ........................ 10-2017-0124518

Signed and Sealed this
Twenty-second Day of September, 2020

Andrei Iancu
*Director of the United States Patent and Trademark Office*